United States Patent
Tanaka et al.

(10) Patent No.: US 12,072,693 B2
(45) Date of Patent: Aug. 27, 2024

(54) ANALYSIS DEVICE AND ANALYSIS METHOD

(71) Applicant: TOKYO ELECTRON LIMITED, Tokyo (JP)

(72) Inventors: Koki Tanaka, Miyagi (JP); Ryu Nagai, Miyagi (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 581 days.

(21) Appl. No.: 17/193,026

(22) Filed: Mar. 5, 2021

(65) Prior Publication Data

US 2021/0312610 A1   Oct. 7, 2021

(30) Foreign Application Priority Data

Mar. 13, 2020  (JP) .................................. 2020-044349
Sep. 10, 2020  (JP) .................................. 2020-151905

(51) Int. Cl.
*G06T 7/00*     (2017.01)
*G05B 23/02*   (2006.01)
*G06N 20/00*   (2019.01)

(52) U.S. Cl.
CPC ......... *G05B 23/0221* (2013.01); *G06N 20/00* (2019.01); *G06T 7/0008* (2013.01); *G06T 2207/10036* (2013.01); *G06T 2207/30148* (2013.01)

(58) Field of Classification Search
CPC ................ G06N 20/00; G06T 7/0008; G06T 2207/30148; G06T 2207/10036; G05B 23/0221; G05B 23/024
See application file for complete search history.

(56) References Cited

U.S. PATENT DOCUMENTS

| | | | | |
|---|---|---|---|---|
| 6,092,017 A | * | 7/2000 | Ishida ................ | F02D 41/1404 706/2 |
| 2011/0315661 A1 | | 12/2011 | Morisawa et al. | |
| 2017/0178874 A1 | * | 6/2017 | Kawaguchi ....... | H01J 37/32935 |

(Continued)

FOREIGN PATENT DOCUMENTS

JP         2010-219263 A       9/2010

OTHER PUBLICATIONS

Tsuchiya et al "Time Sequential Data Analyzer, Time Sequential Data Analysis System, Time Sequential Data Analysis Method, Program and Recording Medium" May 22, 2008, JP 2008117381 A (Year: 2008).*

(Continued)

*Primary Examiner* — Sang H Nguyen
(74) *Attorney, Agent, or Firm* — XSENSUS LLP

(57) ABSTRACT

An analysis device includes learning circuitry configured to perform machine learning using a time series data group measured in association with a processing of an object in a processing space and to calculate a value indicating a relationship of time series data in a corresponding time range between respective measurement items and evaluation circuitry configured to evaluate an unknown condition of the processing space based on the value indicating the relationship calculated by performing machine learning by the learning circuitry using a time series data group measured in association with a processing of the object under a known condition of the processing space.

16 Claims, 28 Drawing Sheets

(56) References Cited

U.S. PATENT DOCUMENTS

2017/0315960 A1* 11/2017 Ochiai .................. G06Q 50/04
2019/0228516 A1* 7/2019 Umeda ................. G06V 10/70
2019/0302750 A1* 10/2019 Oh ..................... G05B 23/0221
2019/0385020 A1* 12/2019 Umeda ..................... G06T 7/00

OTHER PUBLICATIONS

Kojima "Data Analysis System, Data Analysis Method and Program", Sep. 8, 2018, JP 2018124639 A (Year: 2018).*
Nakago et al "Learning Device, Inference Device and Trained Model", Mar. 12, 2020, WO2020050072 A1 (Year: 2020).*
Kaushal et al "Improving Tool Performance by Linking Spectroscopic Information With Tool Operational Parameters and Material Measurements", Jan. 24, 2014, KR 20140010381 A (Year: 2014).*

* cited by examiner

FIG. 4A

FIRST LEARNING DATA (CONDITION 3)
FIRST LEARNING DATA (CONDITION 2)

| FIRST LEARNING DATA (CONDITION 1) | | | |
|---|---|---|---|
| DEVICE | LOT NUMBER | TYPE OF RECIPE | TIME SERIES DATA GROUP |
| CHAMBER A | Lot1a | STANDARD RECIPE | TIME SERIES DATA GROUP 1a |
| | | STANDARD RECIPE | TIME SERIES DATA GROUP 2a |
| | | STANDARD RECIPE | TIME SERIES DATA GROUP 3a |
| | | STANDARD RECIPE | TIME SERIES DATA GROUP 4a |
| | Lot2a | STANDARD RECIPE | TIME SERIES DATA GROUP 5a |
| | | STANDARD RECIPE | TIME SERIES DATA GROUP 6a |
| | | STANDARD RECIPE | TIME SERIES DATA GROUP 7a |
| | | STANDARD RECIPE | TIME SERIES DATA GROUP 8a |
| | Lot3a | STANDARD RECIPE | TIME SERIES DATA GROUP 9a |
| | | STANDARD RECIPE | TIME SERIES DATA GROUP 10a |
| | | | |

FIG. 4B

| SECOND LEARNING DATA | | | |
|---|---|---|---|
| DEVICE | LOT NUMBER | TYPE OF RECIPE | TIME SERIES DATA GROUP |
| CHAMBER A | Lot1x | STANDARD RECIPE | TIME SERIES DATA GROUP 1x |
| | | STANDARD RECIPE | TIME SERIES DATA GROUP 2x |
| | | STANDARD RECIPE | TIME SERIES DATA GROUP 3x |
| | | STANDARD RECIPE | TIME SERIES DATA GROUP 4x |
| | Lot2x | STANDARD RECIPE | TIME SERIES DATA GROUP 5x |
| | | STANDARD RECIPE | TIME SERIES DATA GROUP 6x |
| | | STANDARD RECIPE | TIME SERIES DATA GROUP 7x |
| | | STANDARD RECIPE | TIME SERIES DATA GROUP 8x |
| | Lot3x | STANDARD RECIPE | TIME SERIES DATA GROUP 9x |
| | | STANDARD RECIPE | TIME SERIES DATA GROUP 10x |
| | | | |

FIG. 15

| CONDITION ADJUSTMENT PARAMETER DETERMINATION TABLE | | ~1500 |
|---|---|---|
| CURRENT CONDITION | RECIPE ACCORDING TO CONDITION | CLEANING RECIPE |
| CONDITION 1 | RECIPE 1 | CLEANING RECIPE C |
| CONDITION 2 | RECIPE 2 | |
| CONDITION 3 | RECIPE 3 | |
| CONDITION 4 | RECIPE 4 | |

*FIG. 19*

| CONDITION ADJUSTMENT PARAMETER DETERMINATION TABLE | | |
|---|---|---|
| CURRENT CONDITION | POSITION OF FOCUS RING | APPLIED VOLTAGE |
| CONDITION 1 | POSITION 1 | DC1 |
| CONDITION 2 | POSITION 2 | DC2 |
| CONDITION 3 | POSITION 3 | DC3 |
| CONDITION 4 | POSITION 4 | DC4 |

ANALYSIS DEVICE AND ANALYSIS METHOD

CROSS-REFERENCE TO RELATED APPLICATIONS

This application is based on and claims priority from Japanese Patent Application Nos. 2020-044349 and 2020-151905 filed on Mar. 13, 2020 and Sep. 10, 2020, respectively, with the Japan Patent Office, the disclosures of which are incorporated herein in their entireties by reference.

TECHNICAL FIELD

The present disclosure relates to an analysis device, an analysis method, and a storage medium that stores an analysis program.

BACKGROUND

In general, changes in conditions in the processing space of a manufacturing process have an influence on the quality of a resulting product when an object is processed in the processing space. Therefore, in the processing of the object, it is important to know the condition of the processing space in order to maintain the quality of the resulting product.

Meanwhile, in the manufacturing process, various data sets (data sets of a plurality of types of time series data, hereinafter referred to as a time series data group) are acquired in association with the processing of the object. Further, the acquired time series data group also contains time series data that correlates with the condition of the processing space. See, for example, Japanese Patent Laid-Open Publication No. 2010-219263.

SUMMARY

An analysis device according to one aspect of the present disclosure has, for example, the following configuration. That is, the analysis device includes a learning unit configured to perform machine learning using a time series data group measured in association with a processing of an object in a processing space and to calculate a value indicating a relationship of time series data in a corresponding time range between respective measurement items; and an evaluation unit configured to evaluate an unknown condition of the processing space based on the value indicating the relationship calculated by performing machine learning by the learning unit using a time series data group measured in association with a processing of the object under a known condition of the processing space.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIGS. 4A and 4B are diagrams illustrating an example of learning data.

FIG. 15 is a diagram illustrating a specific example of a condition adjustment method when OES data is used to evaluate the condition.

FIG. 19 is a diagram illustrating a specific example of a condition adjustment method when process data is used to evaluate the condition.

DETAILED DESCRIPTION

Figure 1:
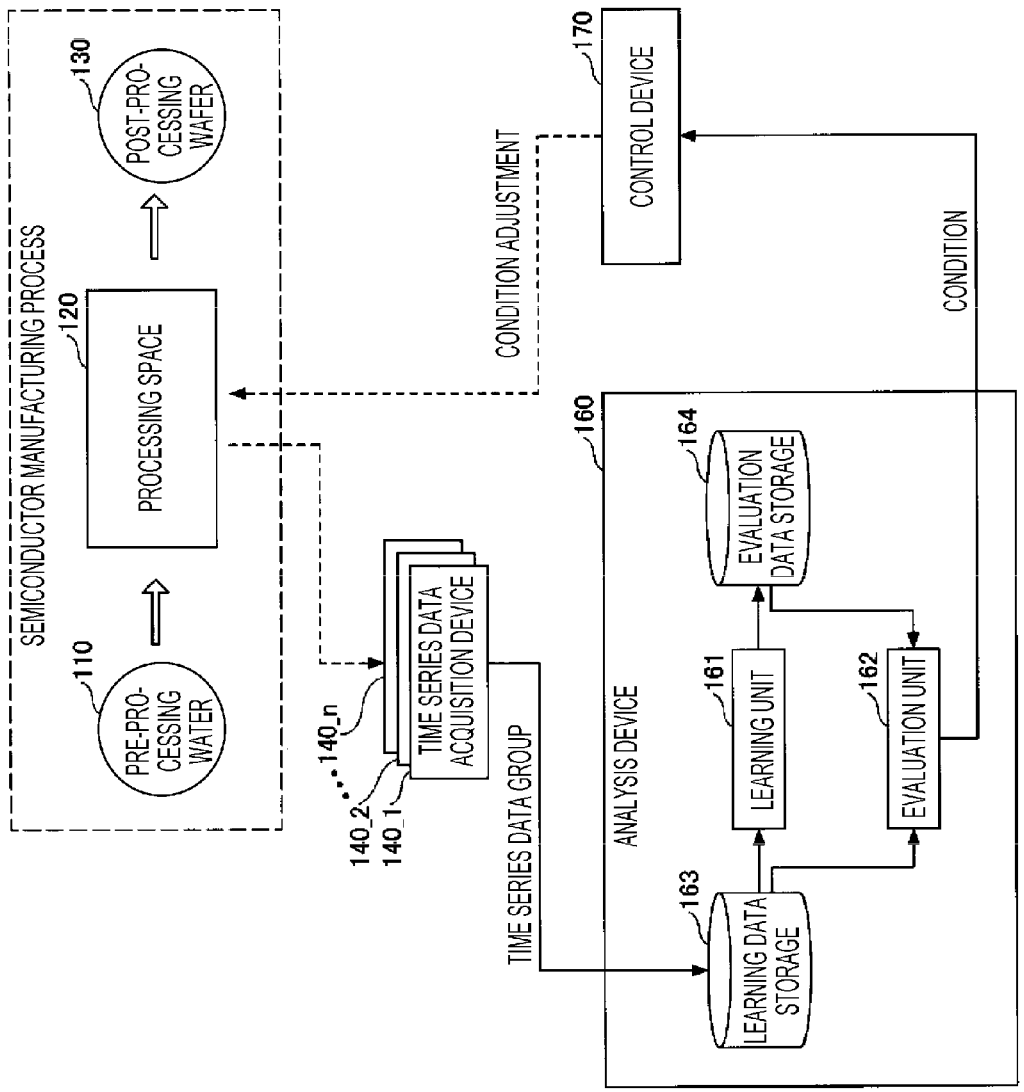
FIG. 1 is a first diagram illustrating an example of a system configuration of a condition adjustment system.

In the following detailed description, reference is made to the accompanying drawings, which form a part hereof. The illustrative embodiments described in the detailed description, drawing, and claims are not meant to be limiting. Other embodiments may be utilized, and other changes may be made without departing from the spirit or scope of the subject matter presented here.

Hereinafter, each embodiment will be described with reference to the accompanying drawings. In the present specification and the drawings, the same reference numerals will be given to components having substantially the same functional configuration to omit duplicate descriptions thereof.

First Embodiment

<System Configuration of Condition Adjustment System>

First, a system configuration of a condition adjustment system will be described. FIG. 1 is a first diagram illustrating an example of a system configuration of a condition adjustment system. As illustrated in FIG. 1, the condition adjustment system 100 includes a semiconductor manufacturing process which is an example of a manufacturing process, time series data acquisition devices 140_1 to 140_n, an analysis device 160, and a control device 170.

The semiconductor manufacturing process processes an object (pre-processing wafer 110) in a predetermined processing space 120, and generates a resulting product (post-processing wafer 130). As used herein, the pre-processing wafer 110 refers to a wafer (substrate) before being processed in the processing space 120, and the post-processing wafer 130 refers to a wafer (substrate) after being processed in the processing space 120.

The time series data acquisition devices 140_1 to 140_n each measure time-series data in association with the processing of the pre-processing wafer 110 in the processing space 120. The time series data acquisition devices 140_1 to 140_n are assumed to perform measurements for different types of measurement items. The number of measurement items measured by each of the time series data acquisition devices 140_1 to 140_n may be one or more.

A time series data group measured by the time series data acquisition devices 140_1 to 140_n is stored as learning data in a learning data storage 163 of the analysis device 160.

An analysis program is installed in the analysis device 160, and when the program is executed, the analysis device 160 functions as a learning unit 161 and an evaluation unit 162.

The learning unit 161 performs machine learning using a time series data group (first learning data) which is the time series data group measured by the time series data acquisition devices 140_1 to 140_n and which is measured when the pre-processing wafer 110 is processed using a standard recipe (predetermined specific recipe) under a condition in which the processing space 120 is normal. Thus, the learning unit 161 generates "first evaluation data" for quantitatively evaluating the condition of the processing space 120.

The learning unit 161 performs machine learning using each time series data group when the pre-processing wafer 110 is processed under a plurality of known conditions of the processing space 120 (but under all normal conditions), and generates first evaluation data. Further, the learning unit 161 stores each generated first evaluation data in an evaluation data storage 164 as information indicating the corresponding condition.

The evaluation unit 162 performs machine learning using a time series data group (second learning data) which is the time series data group measured by the time series data acquisition devices 140_1 to 140_n and which is measured when the pre-processing wafer 110 is processed using a standard recipe under an unknown condition of the processing space 120, and generates "second evaluation data."

Further, the evaluation unit 162 compares the second evaluation data with each first evaluation data stored in the evaluation data storage 164 to determine which of the first evaluation data is similar to the second evaluation data. Thus, the evaluation unit 162 evaluates the unknown condition of the processing space 120. Furthermore, the evaluation unit 162 notifies the control device 170 of the evaluated condition.

The control device 170 adjusts the condition of the processing space 120 based on the condition evaluated by the evaluation unit 162 of the analysis device 160.

<Processing Space in Semiconductor Manufacturing Process>

Figure 2:
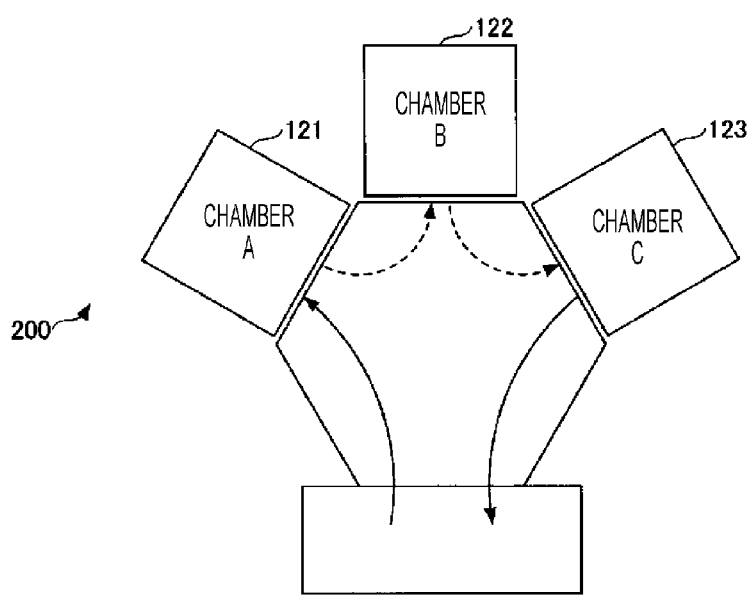
FIG. 2 is a diagram illustrating an example of a semiconductor manufacturing process.

Next, the predetermined processing space 120 of the semiconductor manufacturing process will be described. FIG. 2 is a diagram illustrating an example of a semiconductor manufacturing process. As illustrated in FIG. 2, the semiconductor manufacturing process 200 includes a plurality of chambers which are an example of a processing space. In the example of FIG. 2, the semiconductor manufacturing process 200 includes chambers from reference numeral 121 (name="chamber A") to reference numeral 123 (name="chamber C"), and the pre-processing wafer is processed in each chamber.

The semiconductor manufacturing process 200 includes the above-mentioned time series data acquisition devices 140_1 to 140_n for each chamber, and the time series data group is measured in each chamber. Therefore, the condition of the chamber B may be evaluated, for example, by comparing the first evaluation data generated using the time series data group measured in the chamber A with the second evaluation data generated using the time series data group measured in the chamber B.

However, in the following, for the brevity of description, a case where the first and second evaluation data generated for the same chamber are used to evaluate the condition will be described. Further, in the following, it will be described that the chamber for which the condition is evaluated is the chamber A.

<Hardware Configuration of Analysis Device>

Figure 3:
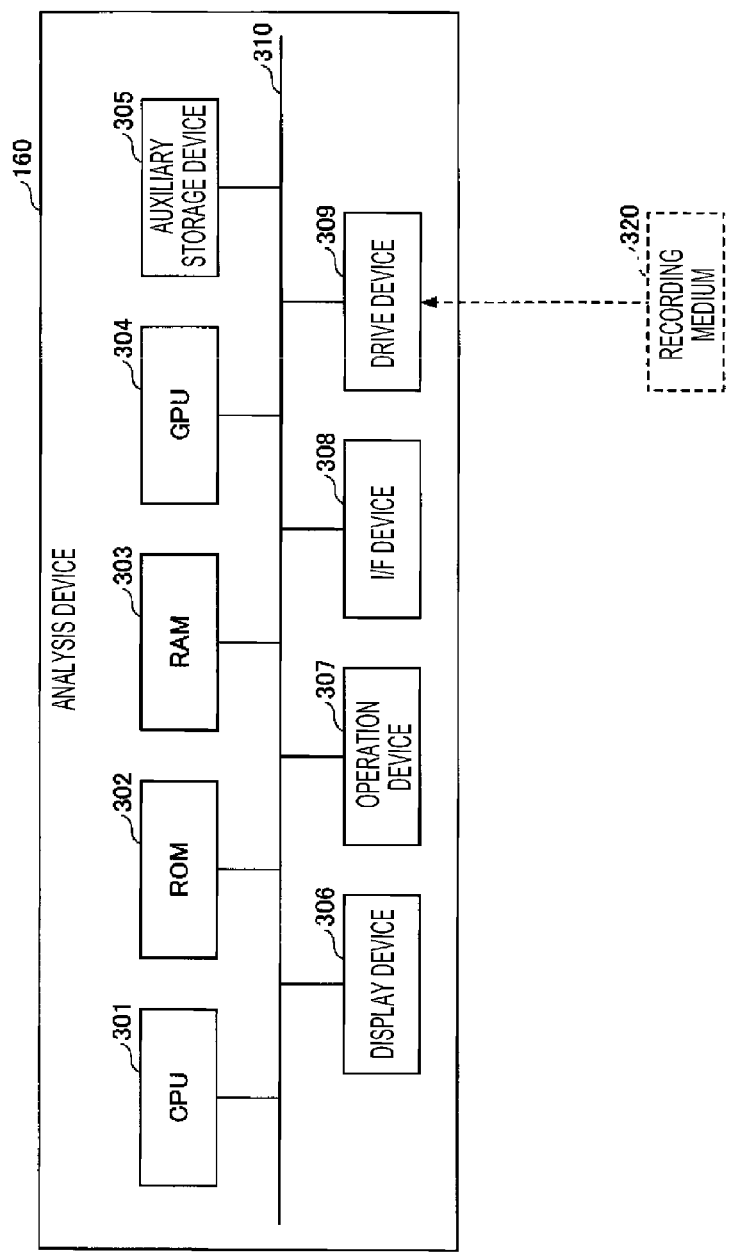
FIG. 3 is a diagram illustrating an example of a hardware configuration of an analysis device.

Next, a hardware configuration of the analysis device 160 will be described. FIG. 3 is a diagram illustrating an example of a hardware configuration of an analysis device. As illustrated in FIG. 3, the analysis device 160 includes a central processing unit (CPU) 301, a read only memory (ROM) 302, and a random access memory (RAM) 303. Further, the analysis device 160 includes a graphics processing unit (GPU) 304. Processors (processing circuits or processing circuitry) such as the CPU 301 and GPU 304 and memories such as the ROM 302 and the RAM 303 form a so-called computer.

Furthermore, the analysis device 160 includes an auxiliary storage device 305, a display device 306, an operation device 307, an interface (I/F) device 308, and a drive device 309. The respective hardware components of the analysis device 160 are connected to each other via a bus 310.

The CPU 301 is an arithmetic device that executes various programs (e.g., analysis programs) installed in the auxiliary storage device 305.

The ROM 302 is a non-volatile memory, and functions as a main storage device. The ROM 302 stores various programs and data required for the CPU 301 to execute various programs installed in the auxiliary storage device 305. Specifically, the ROM 302 stores a boot program such as a basic input/output system (BIOS) or extensible firmware interface (EFI).

The RAM 303 is a volatile memory such as a dynamic random access memory (DRAM) or a static random access memory (SRAM), and functions as a main storage device. The ROM 303 provides a work area which is expanded when various programs installed in the auxiliary storage device 305 are executed by the CPU 301.

The GPU 304 is an arithmetic device for an image processing, and in the present embodiment, performs a high-speed arithmetic operation by a parallel processing for the time series data group when the analysis program is executed by the CPU 301. The GPU 304 is equipped with an internal memory (GPU memory), and temporarily holds information required when performing the parallel processing for various time series data groups.

The auxiliary storage device 305 stores various programs, or various data used when the various programs are executed by the CPU 301. For example, the learning data storage 163 and the evaluation data storage 164 are realized in the auxiliary storage device 305.

The display device 306 is a display device that displays the internal state of the analysis device 160. The operation device 307 is an input device used by an operator of the analysis device 160 when inputting various instructions to the analysis device 160. The I/F device 308 is a connection device that is connected to a network (not illustrated) to perform communication.

The drive device 309 is a device for setting a recording medium 320. As used herein, the recording medium 320 includes a medium that optically, electrically, or magnetically records information, such as a CD-ROM, a flexible disk, or a magneto-optical disk. Further, the recording medium 320 may include a semiconductor memory that electrically records information, such as a ROM or a flash memory.

Various programs to be installed in the auxiliary storage device 305 are installed, for example, as the distributed recording medium 320 is set in the drive device 309 and various programs recorded in the recording medium 320 are read by the drive device 309. Alternatively, various programs to be installed in the auxiliary storage device 305 may be installed by being downloaded via a network (not illustrated).

Specific Example of Learning Data

Next, learning data read from the learning data storage 163 when machine learning is performed by the learning unit 161 or the evaluation unit 162 will be described. FIGS. 4A and 4B are diagrams illustrating an example of learning data.

As illustrated in FIGS. 4A and 4B, the learning data contains, as information items, "device," "lot number," "recipe type," and "time series data group." The chamber name is stored in the "device," and the lot number of each pre-processing wafer is stored in the "lot number."

Further, a name identifying a recipe is stored in the "recipe type." As described above, since the learning data is the time series data group obtained by the processing using the standard recipe, the "standard recipe" is stored in the "recipe type." Further, the measured time series data group is stored in the "time series data group."

Of these, FIG. 4A illustrates an example of first learning data. As illustrated in FIG. 4A, the first learning data 410_1, 410_2, 410_3, . . . contain a time series data group measured when the condition of the chamber A is condition 1, condition 2, condition 3, . . . , respectively.

Meanwhile, FIG. 4B illustrates second learning data. As illustrated in FIG. 4B, the second learning data 420 contains a time series data group measured to evaluate an unknown condition of the chamber A.

Specific Example of Time Series Data Group

Figure 5B:
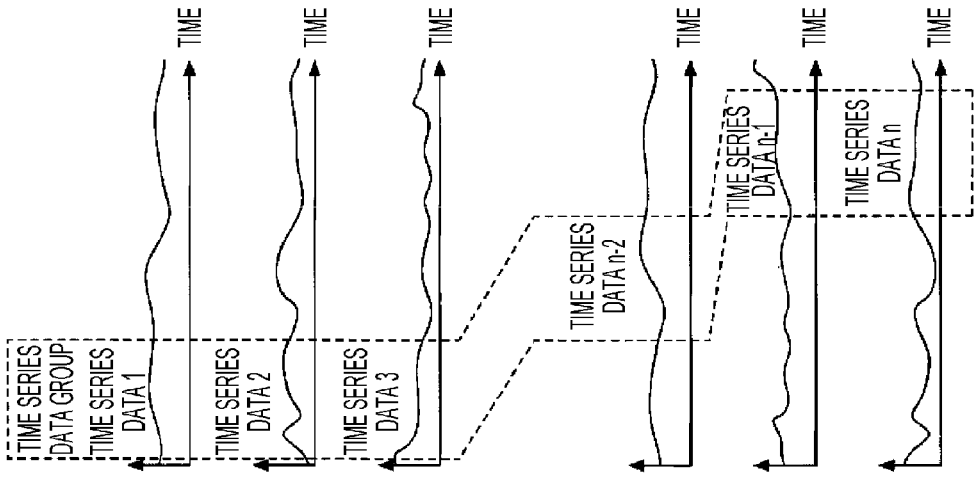
FIGS. 5A and 5B are diagrams illustrating an example of a time series data group.
Figure 5A:
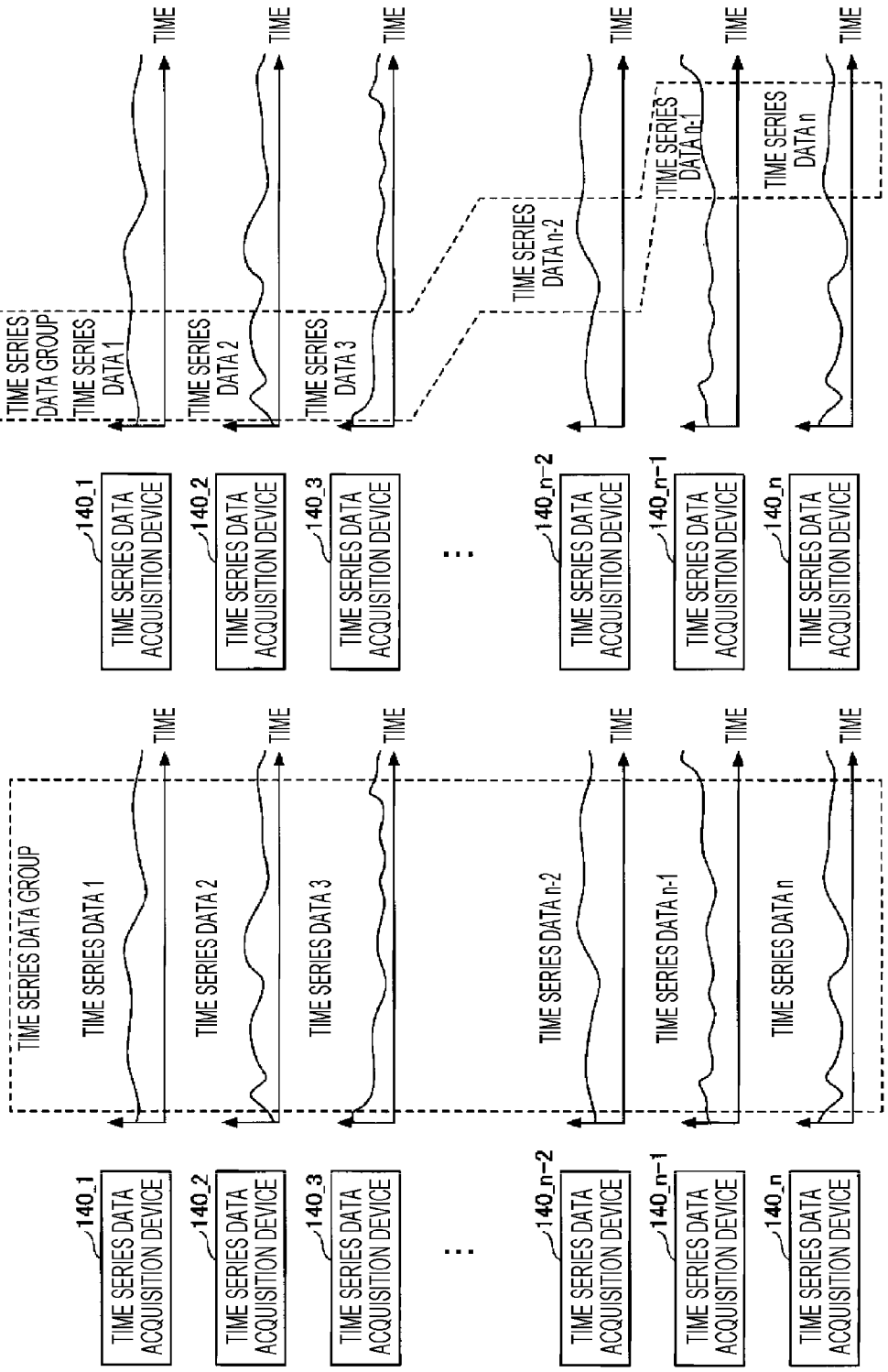

Next, a specific example of the time series data group measured by the time series data acquisition devices 140_1 to 140_n will be described. FIGS. 5A and 5B are diagrams illustrating an example of a time series data group. In the example of FIGS. 5A and 5B, for the brevity of description, it is assumed that the time series data acquisition devices 140_1 to 140_n each measure one-dimensional data, but one time series data acquisition device may measure two-dimensional data (a data set of a plurality of types of one-dimensional data).

FIG. 5A illustrates a time series data group composed of time series data measured in the same time range by the time series data acquisition devices 140_1 to 140_n.

Meanwhile, FIG. 5B illustrates a time series data group composed of time series data measured in the corresponding time range by the time series data acquisition devices 140_1 to 140_n. As illustrated in FIG. 5B, the learning data used for machine learning may contain not only the time series data group composed of time series data measured in the same time range but also the time series data group composed of time series data measured in the corresponding time range.

Specific Example of Processing by Learning Unit

Figure 6:
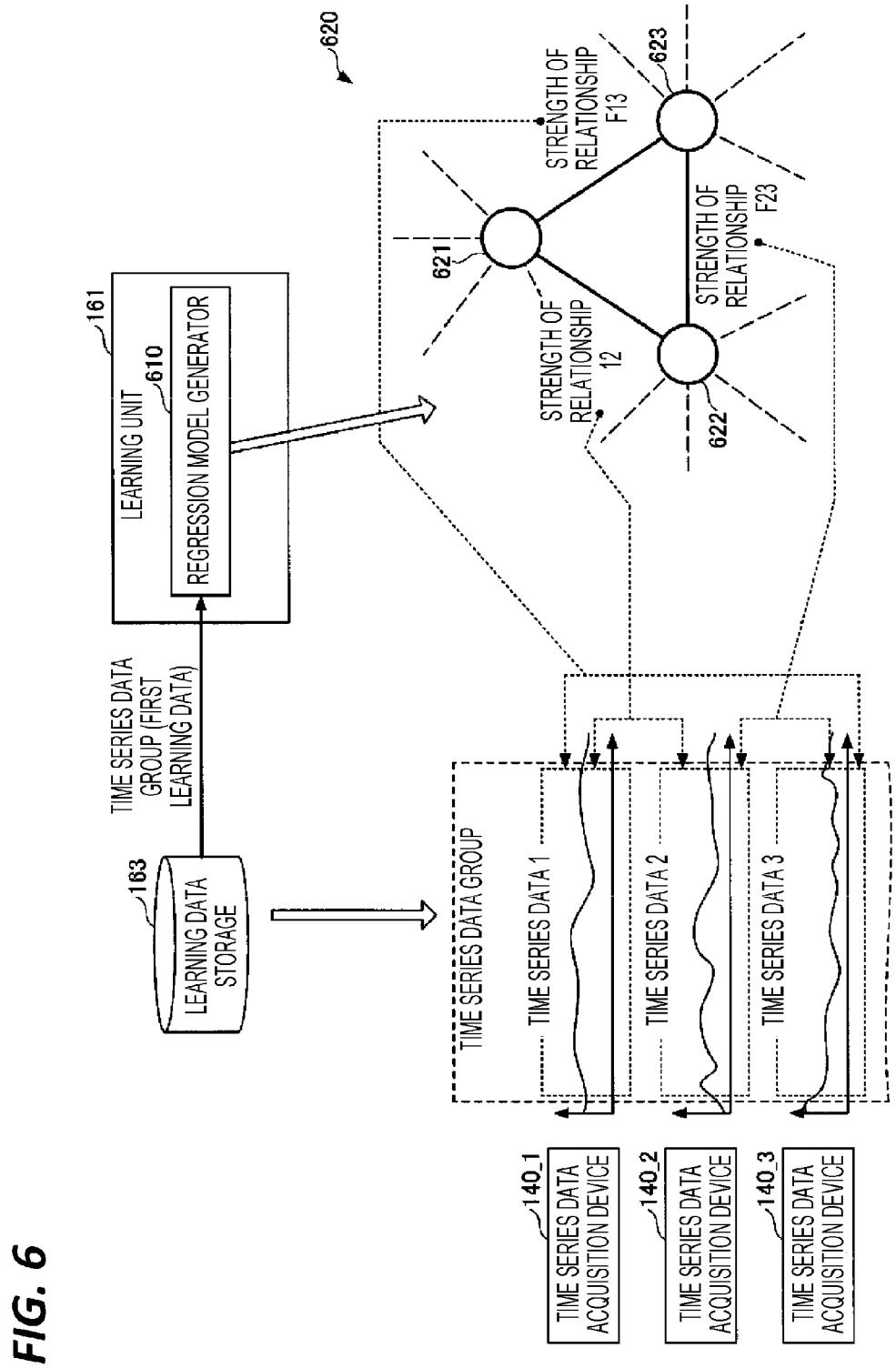
FIG. 6 is a first diagram illustrating a specific example of a processing by a learning unit.

Next, a specific example of a processing by the learning unit 161 of the analysis device 160 will be described. FIG. 6 is a first diagram illustrating a specific example of a processing by a learning unit. As illustrated in FIG. 6, the learning unit 161 includes a regression model generator 610.

As used herein, a regression model is a machine learning model that extracts comprehensively and at a high speed a mutual relationship from a plurality of time series data and that represents the relationship between the plurality of time series data in a linear regression equation or in a non-linear regression equation. An example of the regression model may be a cross-correlation model. The cross-correlation model may include a time delay term considering the time difference between the plurality of time series data.

The regression model generally applied to the manufacturing process is used to monitor the time and place where a relationship between time series data changes and detect the abnormality occurring in the manufacturing process.

Meanwhile, in the analysis device 160 according to the present embodiment, the regression model is used to quantitatively evaluate the condition of a processing space.

Specifically, the regression model generator 610 performs machine learning for the regression model using a time series data group included in the first learning data stored in the learning data storage 163. Thus, the regression model generator 610 calculates a value indicating the strength of a relationship (an example of a value indicating a relationship) of time series data between measurement items measured by each of the time series data acquisition devices 140_1 to 140_n.

The example of FIG. 6 illustrates, for the brevity of description, a state where a value indicating the strength of a relationship of time series data in the same time range between three measurement items is calculated. Specifically, the example of FIG. 6 illustrates a state where machine learning for a regression model 620 is performed by inputting time series data 1 measured by the time series data acquisition device 140_1, time series data 2 measured by the time series data acquisition device 140_2, and time series data 3 measured by the time series data acquisition device 140_3, and a value indicating the strength of a relationship between these time series data is calculated.

In the regression model 620, a node 621 corresponds to the time series data acquisition device 140_1, and a node 622 corresponds to the time series data acquisition device 140_2. Further, a node 623 corresponds to the time series data acquisition device 140_3.

According to the example of FIG. 6, a value indicating the strength of a relationship between the time series data 1 and the time series data 2 is "F12," and a value indicating the strength of a relationship between the time series data 1 and the time series data 3 is "F13." Further, a value indicating the strength of a relationship between the time series data 2 and the time series data 3 is "F23."

The regression model generator 610 performs the same machine learning for each regression model for each condition using, for example, the first learning data separately stored for each condition in the chamber A.

Figure 7:
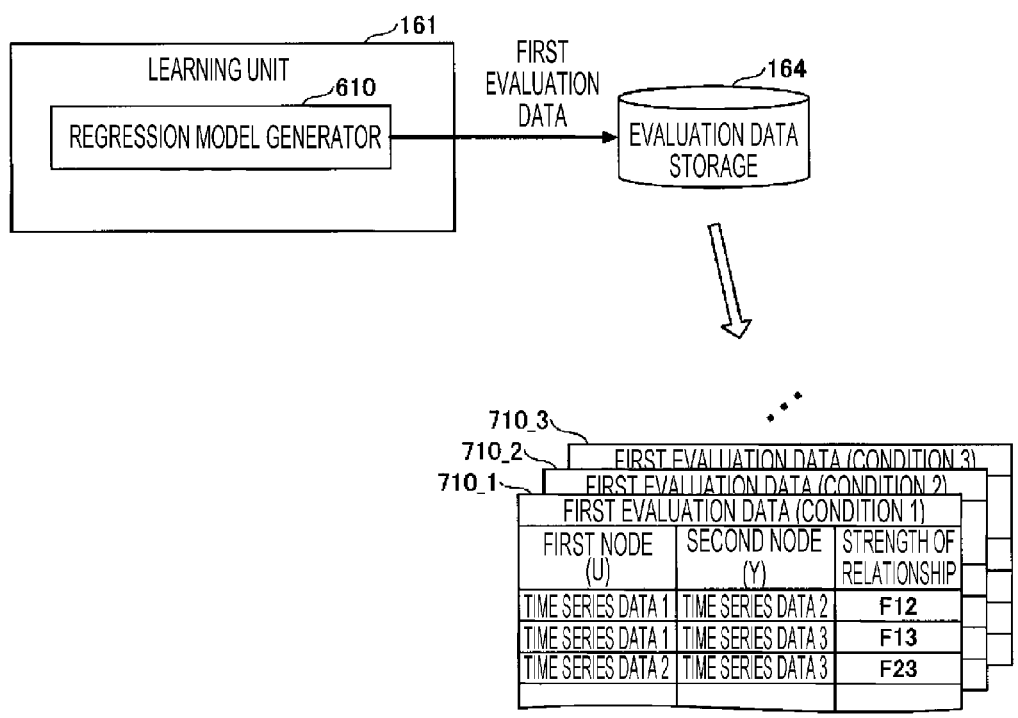
FIG. 7 is a second diagram illustrating a specific example of a processing by a learning unit.

FIG. 7 is a second diagram illustrating a specific example of a processing by a learning unit, and illustrates a state where the first evaluation data is generated by the regression model generator 610. As illustrated in FIG. 7, the first evaluation data contains, as information items, "first node" (first measurement item), "second node" (second measurement item), and "the strength of a relationship."

In the "first node" and the "second node," time series data used to calculate a value indicating the strength of a relationship of the time series data group included in the first learning data is stored.

In "the strength of a relationship," a value indicating the strength of a relationship between time series data stored in the "first node" and time series data stored in the "second node" is stored.

As illustrated in FIG. 7, the first evaluation data is generated for each condition. In the example of FIG. 7, first evaluation data 710_1 is evaluation data indicating the condition 1, and first evaluation data 710_2 is evaluation data indicating the condition 2. Further, first evaluation data 710_3 is evaluation data indicating the condition 3.

The first evaluation data 710_1, 710_2, 710_3, . . . generated by the regression model generator 610 are stored in the evaluation data storage 164 as information indicating different conditions, respectively.

Specific Example 1 of Processing by Evaluation Unit

Figure 8:
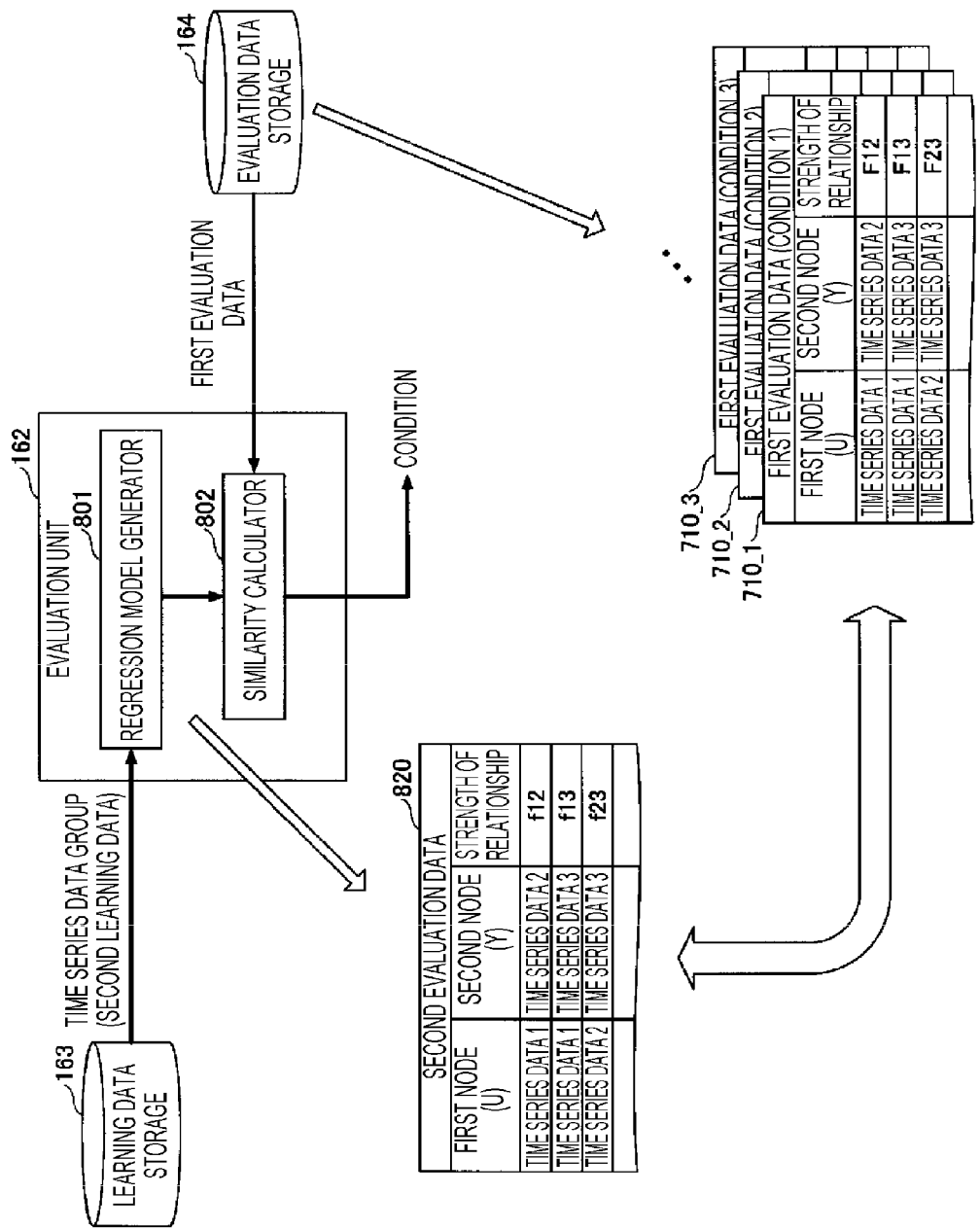
FIG. 8 is a first diagram illustrating a specific example of a processing by an evaluation unit.

Next, a specific example 1 of a processing by the evaluation unit 162 of the analysis device 160 will be described. FIG. 8 is a first diagram illustrating a specific example of a processing by an evaluation unit. As illustrated in FIG. 8, the evaluation unit 162 includes a regression model generator 801 and a similarity calculator 802.

The regression model generator 801 performs machine learning for a regression model using the time series data group included in the second learning data stored in the learning data storage 163. Thus, the regression model generator 801 generates the regression model, and calculates a value indicating the strength of a relationship of time series data between respective measurement items measured by each of the time series data acquisition devices 140_1 to 140_n.

As a result, the regression model generator 801 generates second evaluation data 820. As illustrated in FIG. 8, the second evaluation data 820 has the same information items as the first evaluation data 710_1, 710_2, 710_3, . . . .

The similarity calculator 802 calculates the similarity of the second evaluation data 820 generated by the regression model generator 801 to the first evaluation data 710_1, 710_2, 710_3, . . . stored in the evaluation data storage 164.

Specifically, the similarity calculator 802 compares values indicating the strength of a relationship in a case where all of the measurement items of the time series data of the "first node" and the "second node" are the same between the first evaluation data and the second evaluation data to calculate the similarity.

For example, the similarity calculator 802 compares
the value "f12" indicating the strength of a relationship when the measurement item of the time series data of the "first node" of the second evaluation data 820 is "time series data 1" and the measurement item of the time series data of the "second node" is "time series data 2" with
the value "F12" indicating the strength of a relationship when the measurement item of the time series data of the "first node" of the first evaluation data 710_1 is "time series data 1" and the measurement item of the time series data of the "second node" is "time series data 2."

Similarly, the similarity calculator 802 compares
the value "f13" indicating the strength of a relationship when the measurement item of the time series data of the "first node" of the second evaluation data 820 is "time series data 1" and the measurement item of the time series data of the "second node" is "time series data 3" with
the value "F13" indicating the strength of a relationship when the measurement item of the time series data of the "first node" of the first evaluation data 710_1 is "time series data 1" and the measurement item of the time series data of the "second node" is "time series data 3."

The similarity calculator 802 calculates the similarity to the first evaluation data 710_1, 710_2, 710_3, . . . by comparing the values indicating the strength of a relationship for all combinations in the second evaluation data 820.

Further, the similarity calculator 802 evaluates the first evaluation data determined to have the calculated maximum similarity as the condition of the chamber A when the time series data group included in the second learning data 420 is measured.

For example, when the similarity to the first evaluation data 710_1 is maximum, the similarity calculator 802 evaluates the condition of the chamber A as the "condition 1" when the time series data group included in the second learning data 420 is measured.

As described above, the analysis device 160 according to the present embodiment calculates a value indicating the strength of a relationship between time series data to evaluate the condition, instead of analyzing features of the time series data individually.

Thus, according to the analysis device 160 of the present embodiment, it is possible to appropriately capture minute changes in the time series data due to changes in the condition of the chamber. As a result, according to the analysis device 160 of the present embodiment, the condition of the chamber may be accurately evaluated based on the time series data group.

Specific Example 2 of Processing by Evaluation Unit

Next, a specific example 2 of a processing by the evaluation unit 162 of the analysis device 160 will be described.

Figure 9:
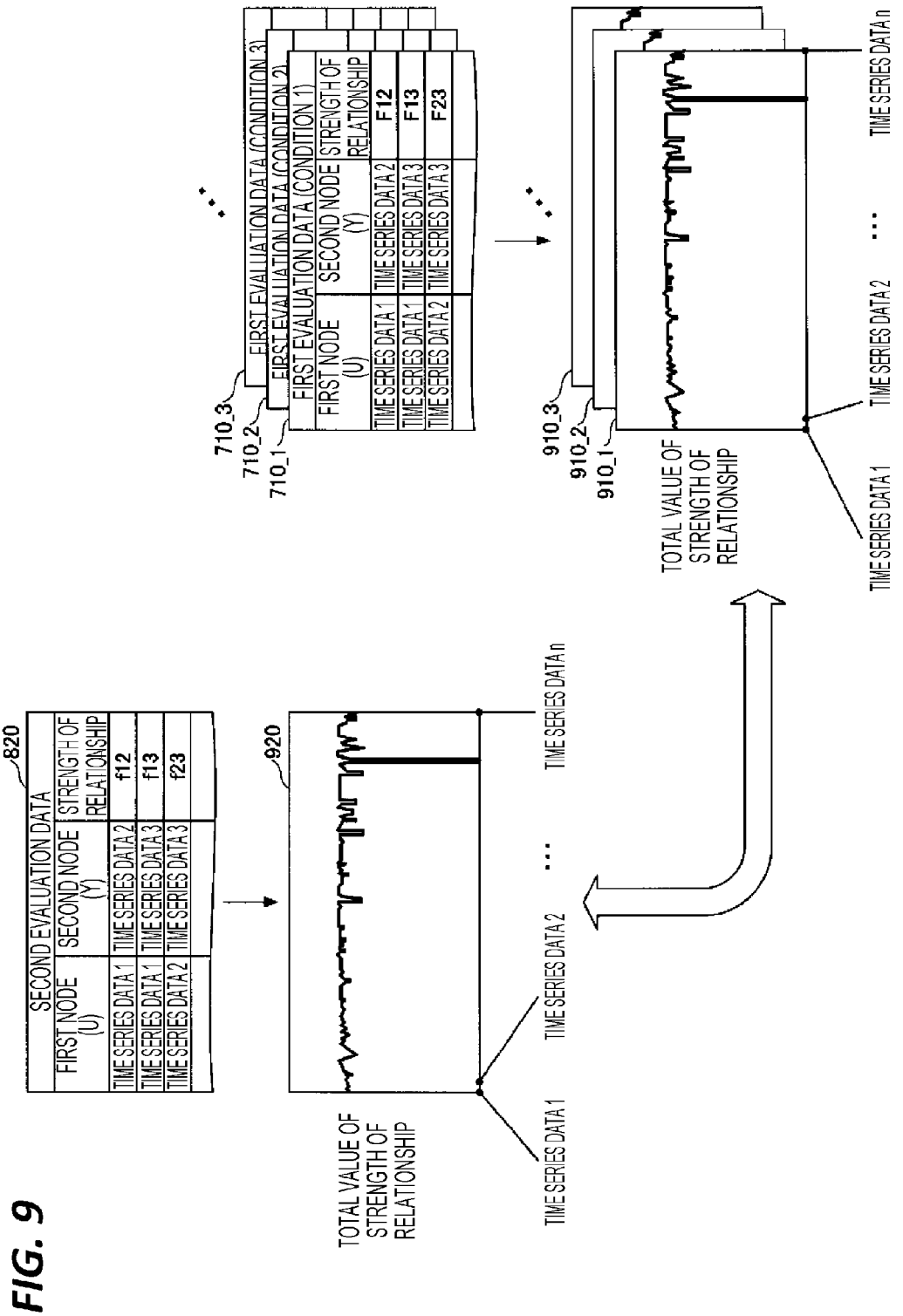
FIG. 9 is a second diagram illustrating a specific example of a processing by an evaluation unit.

FIG. 9 is a second diagram illustrating a specific example of a processing by an evaluation unit. In the case of FIG. 9, the similarity calculator 802 sums the first evaluation data and the second evaluation data for each measurement item of the time series data of the first node, and then calculates the similarity to evaluate the condition.

In FIG. 9, a graph 910_1 is a graph obtained by summing the first evaluation data 710_1 for each measurement item of the first node, and the horizontal axis represents the measurement item of the time series data of the first node and the vertical axis represents the total value of values indicating the strength of a relationship.

For example, the total value of values indicating the strength of a relationship corresponding to the "time series data 1" in the graph 910_1 is a value obtained by summing
- the value "F12" indicating the strength of a relationship when the measurement item of the time series data of the "first node" of the first evaluation data 710_1 is the "time series data 1" and the measurement item of the time series data of the "second node" is the "time series data 2,"
- the value "F13" indicating the strength of a relationship when the measurement item of the time series data of the "first node" of the first evaluation data 710_1 is the "time series data 1" and the measurement item of the time series data of the "second node" is the "time series data 3," . . . .

Similarly, in FIG. 9, a graph 920 is a graph obtained by summing the second evaluation data for each measurement item of the time series data of the first node, and the horizontal axis represents the measurement item of the time series data of the first node and the vertical axis represents the total value (another example of a value indicating a relationship) of values indicating the strength of a relationship.

For example, the total value of values indicating the strength of a relationship corresponding to the "time series data 1" in the graph 920 is a value obtained by summing
- the value "f12" indicating the strength of a relationship when the measurement item of the time series data of the "first node" of the second evaluation data 820 is the "time series data 1" and the measurement item of the time series data of the "second node" is the "time series data 2,"
- the value "f13" indicating the strength of a relationship when the measurement item of the time series data of the "first node" of the second evaluation data 820 is the "time series data 1" and the measurement item of the time series data of the "second node" is the "time series data 3," . . . .

Then, in the case of FIG. 9, the similarity calculator 802 calculates the similarity by comparing the graphs 910_1, 910_2, 910_3, . . . with the graph 920. Further, in the case of FIG. 9, the similarity calculator 802 evaluates a condition corresponding to a graph having the calculated maximum similarity as the condition of the chamber A when the time series data group included in the second learning data 420 is measured.

For example, when the similarity to the graph 910_1 is maximum, the similarity calculator 802 evaluates the condition of the chamber A as the "condition 1" when the time series data group included in the second learning data 420 is measured.

As described above, the analysis device 160 according to the present embodiment calculates a value indicating the strength of a relationship between time series data to evaluate the condition, instead of analyzing features of the time series data individually.

Thus, according to the analysis device 160 of the present embodiment, it is possible to appropriately capture minute changes in the time series data due to changes in the condition of the chamber. As a result, according to the analysis device 160 of the present embodiment, the condition of the chamber may be accurately evaluated based on the time series data group.

<Flow of Condition Adjustment Processing>

Next, the flow of the entire condition adjustment processing by the condition adjustment system 100 will be described. The condition adjustment processing by the condition adjustment system 100 includes, as an adjustment method when the control device 170 adjusts the condition of the chamber, any of the following two adjustment methods:
- A method of adjusting a recipe in real time based on the condition evaluated in real time during the processing of the pre-processing wafer.
- A method of evaluating the condition after the processing of the pre-processing wafer is completed to adjust the condition to a constant condition by cleaning.

Accordingly, the flow of a condition adjustment processing including each adjustment method will be described below.

Figure 10A:
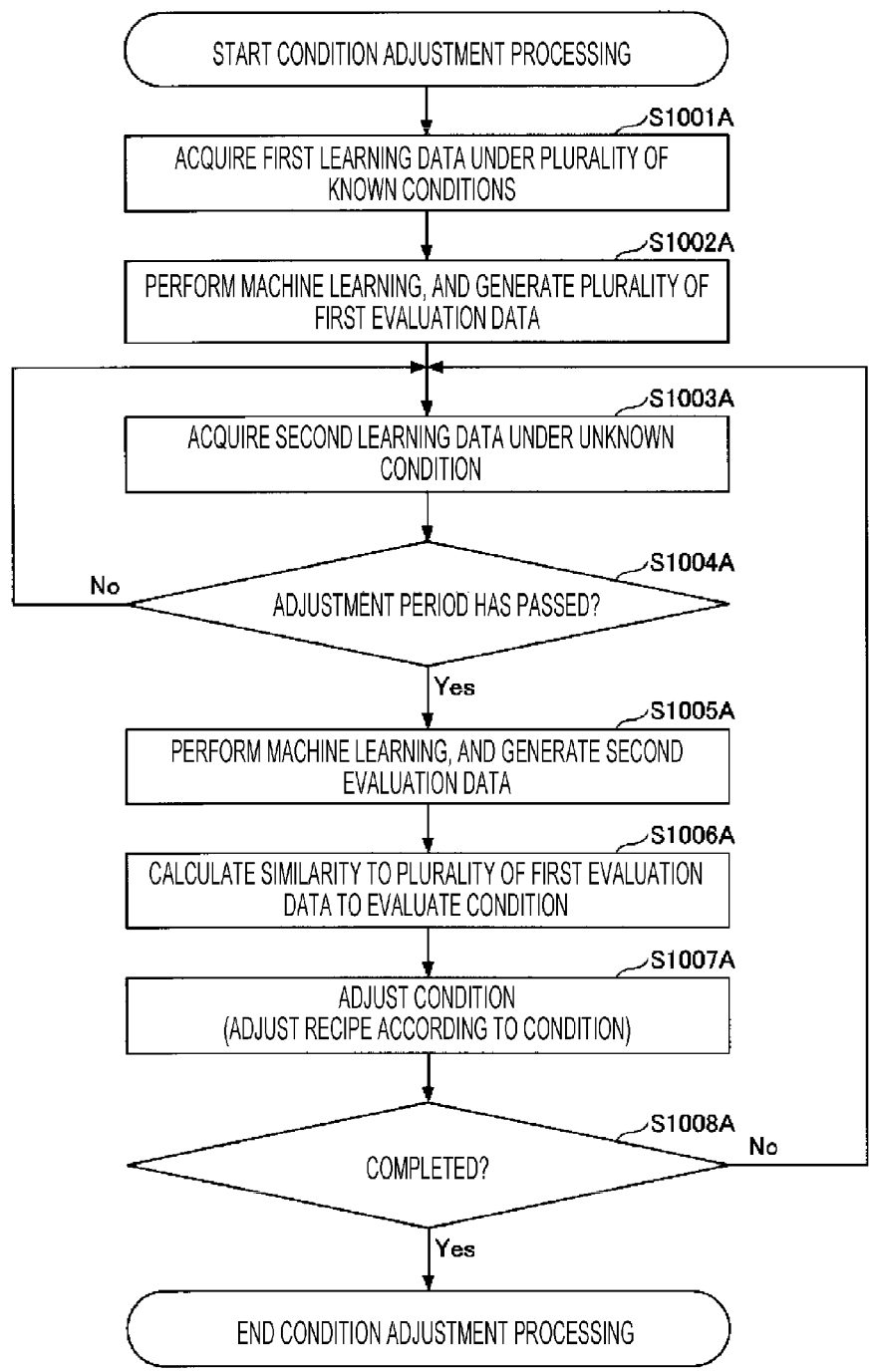
FIG. 10A is a first flowchart illustrating the flow of a condition adjustment processing.

(1) Condition Adjustment Processing Including a Method of Adjusting a Recipe in Real Time FIG. 10A is a first flowchart illustrating the flow of a condition adjustment processing, and is a flowchart illustrating the flow of a condition adjustment processing including a method of adjusting a recipe in real time based on the evaluated condition.

In step S1001A, the time series data acquisition devices 140_1 to 140_n measure the time series data group in association with the processing of the pre-processing wafer in the chamber A and store the time series data group in the learning data storage 163. The time series data acquisition devices 140_1 to 140_n store the time series data group measured in association with the processing under a plurality of known conditions of the chamber A as the first learning data 410_1, 410_2, 410_3, . . . .

In step S1002A, the learning unit 161 of the analysis device 160 performs machine learning for each regression model using the first learning data 410_1, 410_2, 410_3, . . . stored in the learning data storage 163. Further, the learning unit 161 of the analysis device 160 generates the first evaluation data 710_1, 710_2, 710_3, . . . using a value indicating the strength of a relationship calculated when machine learning is performed for each regression model.

In step S1003A, the time series data acquisition devices 140_1 to 140_n measure the time series data group (for a predetermined time range) in association with the processing of the pre-processing wafer in the chamber A and store the time series data group in the learning data storage 163. The time series data acquisition devices 140_1 to 140_n store the time series data group (for a predetermined time range) measured in association with the processing under an unknown condition of the chamber A as the second learning data 420.

In step S1004A, the time series data acquisition devices 140_1 to 140_n determine whether or not a predetermined adjustment period (e.g., 1 second) has passed. When it is determined in step S1004A that the predetermined adjustment period has not passed (No in step S1004A), the processing waits until the predetermined adjustment period passes. Meanwhile, when it is determined in step S1004A that the predetermined adjustment period has passed (Yes in step S1004A), the processing proceeds to step S1005A.

In step S1005A, the evaluation unit 162 of the analysis device 160 performs machine learning for the regression model using the second learning data 420 (data for a predetermined time range retroactively from the time point at which the predetermined adjustment period has passed) stored in the learning data storage 163. Further, the evaluation unit 162 of the analysis device 160 generates the second evaluation data 820 (for a predetermined time range) using a value indicating the strength of a relationship calculated when machine learning for the regression model is performed.

In step S1006A, the evaluation unit 162 of the analysis device 160 determines, among the plurality of first evaluation data 710_1, 710_2, 710_3, . . . , the first evaluation data having the maximum similarity to the second evaluation data 820. Alternatively, the evaluation unit 162 of the analysis device 160 determines, among the graphs 910_1, 910_2, 910_3, . . . calculated based on the plurality of first evaluation data, the graph having the maximum similarity to the graph 920 calculated based on the second evaluation data 820. Thus, the evaluation unit 162 of the analysis device 160 evaluates the unknown condition of the chamber A.

In step S1007A, the control device 170 performs the processing of the pre-processing wafer using a recipe based on the evaluated condition.

In step S1008A, it is determined whether or not the processing of the pre-processing wafer is completed, and when it is determined that the processing is not completed (No in step S1008A), the processing returns to step S1003A. Meanwhile, when it is determined in step S1008A that the processing is completed (Yes in step S1008A), the condition adjustment processing is completed.

Figure 10B:
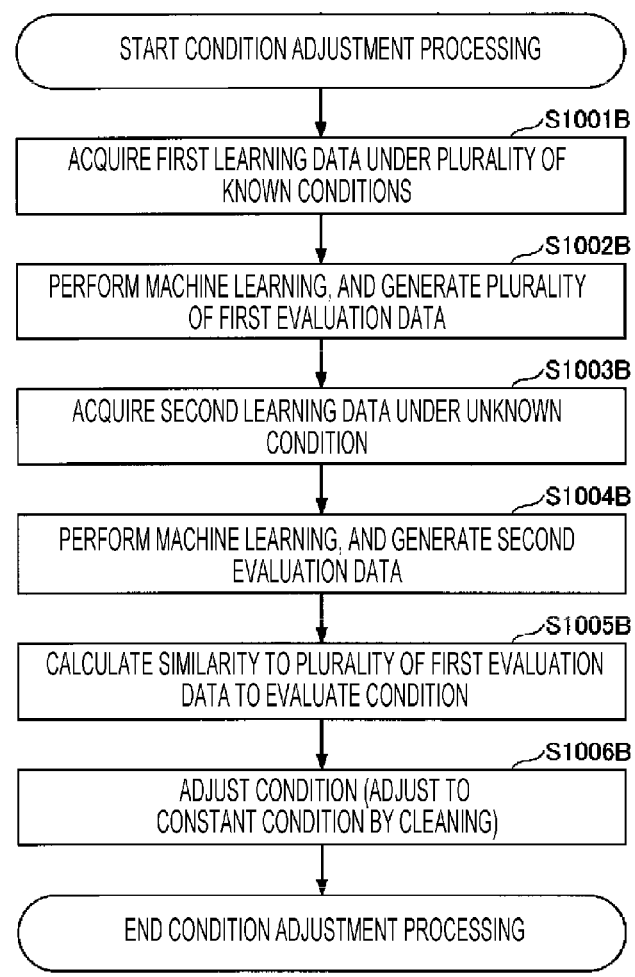
FIG. 10B is a second flowchart illustrating the flow of a condition adjustment processing.

(2) Condition Adjustment Processing Including a Method of Adjusting the Condition to a Constant Condition FIG. 10B is a second flowchart illustrating the flow of a condition adjustment processing, and is a flowchart illustrating the flow of a condition adjustment processing including a method of adjusting the evaluated condition to a constant condition by cleaning.

In step S1001B, the time series data acquisition devices 140_1 to 140_n measure the time series data group in association with the processing of the pre-processing wafer in the chamber A and store the time series data group in the learning data storage 163. The time series data acquisition devices 140_1 to 140_n store the time series data group measured in association with the processing under a plurality of known conditions of the chamber A as the first learning data 410_1, 410_2, 410_3, . . . .

In step S1002B, the learning unit 161 of the analysis device 160 performs machine learning for each regression model using the first learning data 410_1, 410_2, 410_3, . . . stored in the learning data storage 163. Further, the learning unit 161 of the analysis device 160 generates the first evaluation data 710_1, 710_2, 710_3, . . . using a value indicating the strength of a relationship calculated when machine learning is performed for each regression model.

In step S1003B, the time series data acquisition devices 140_1 to 140_n measure the time series data group in association with the processing of the pre-processing wafer in the chamber A and store the time series data group in the learning data storage 163. The time series data acquisition devices 140_1 to 140_n store the time series data group (time series data group until the processing is completed) measured in association with the processing under an unknown condition of the chamber A as the second learning data 420.

In step S1004B, the evaluation unit 162 of the analysis device 160 performs machine learning for the regression model using the second learning data 420 stored in the learning data storage 163. Further, the evaluation unit 162 of the analysis device 160 generates the second evaluation data 820 using a value indicating the strength of a relationship calculated when machine learning is performed for the regression model.

In step S1005B, the evaluation unit 162 of the analysis device 160 determines, among the plurality of first evaluation data 710_1, 710_2, 710_3, . . . , the first evaluation data having the maximum similarity to the second evaluation data 820. Alternatively, the evaluation unit 162 of the analysis device 160 determines, among the graphs 910_1, 910_2, 910_3, . . . calculated based on the plurality of first evaluation data, the graph having the maximum similarity to the graph 920 calculated based on the second evaluation data. Thus, the evaluation unit 162 of the analysis device 160 evaluates the unknown condition of the chamber A.

In step S1006B, the control device 170 adjusts the condition of the chamber to a constant condition by cleaning.

<Summary>

As is clear from the above description, the analysis device according to the first embodiment is configured to:

perform machine learning using the time series data group measured in association with the processing of the pre-processing wafer in the chamber, and calculate a value indicating the strength of a relationship of time series data in the corresponding time range between the respective measurement items; and evaluate an unknown condition of the chamber based on the value indicating the strength of a relationship calculated by performing machine learning using each time series data group measured in association with the processing of the pre-processing wafer under a plurality of known conditions of the chamber.

Thus, according to the analysis device of the first embodiment, the condition of the chamber in the semiconductor manufacturing process may be quantitatively evaluated based on the time series data group.

Second Embodiment

In the first embodiment, specific examples of the time series data acquisition device and the time series data group are not mentioned. Meanwhile, in a second embodiment, descriptions will be made on a case where the time series data acquisition device is an emission spectrophotometer and the time series data group is optical emission spectroscopy (OES) data. The OES data is a data set containing time series data of emission intensity in the same number as the types of wavelengths.

Here, the OES data is known to correlate with the type of a deposit adhering to the chamber or the amount of the deposit. Therefore, by using the OES data as the time series data group, the condition of the chamber may be evaluated from the viewpoint of the type of a deposit adhering to the chamber or the amount of the deposit. Hereinafter, the second embodiment will be described focusing on the differences from the first embodiment.

<System Configuration of Condition Adjustment System>

Figure 11:
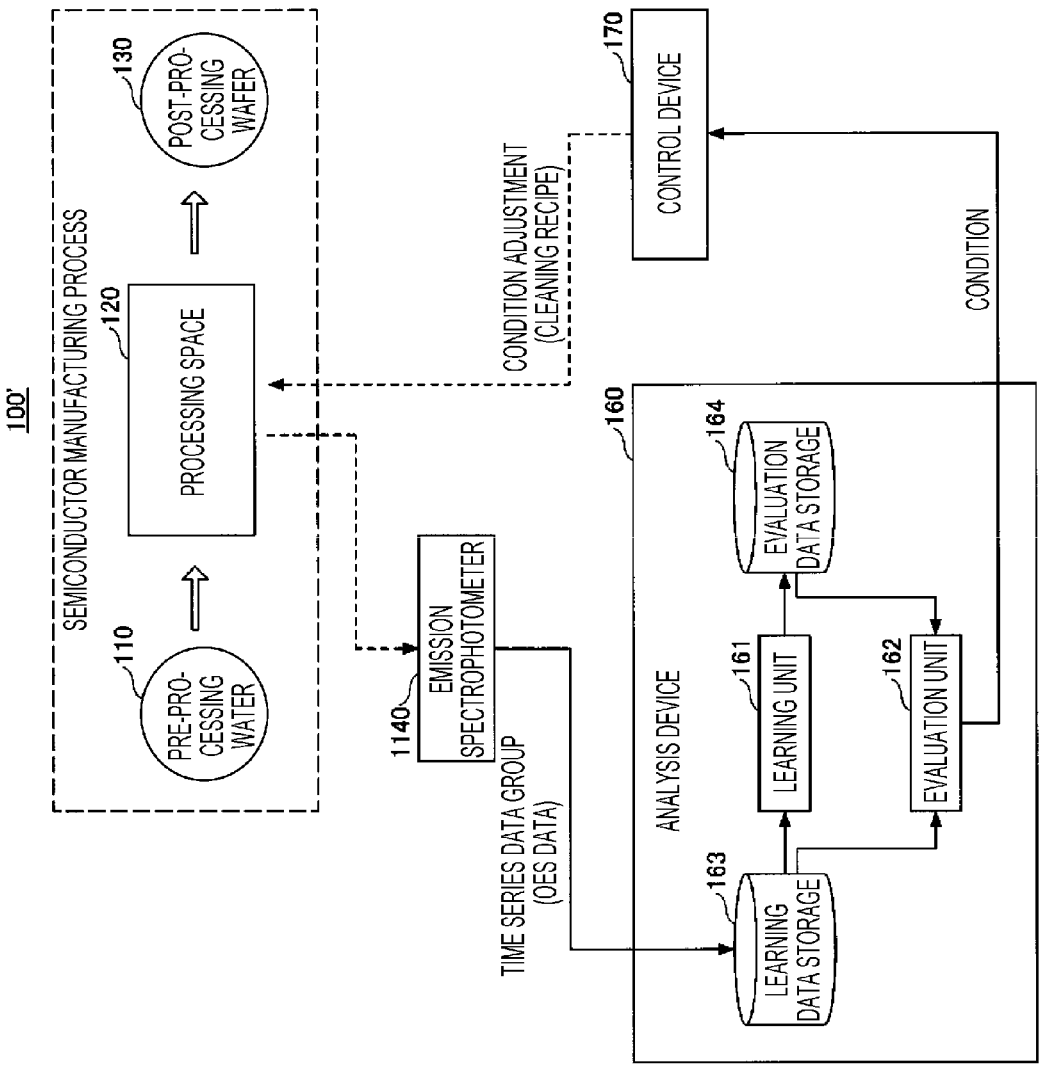
FIG. 11 is a diagram illustrating an example of a system configuration of a condition adjustment system when OES data is used.

First, a system configuration of a condition adjustment system will be described. FIG. 11 is a diagram illustrating an example of a system configuration of a condition adjustment system when OES data is used. The differences from FIG. 1 are that an emission spectrophotometer 1140 is arranged as the time series data acquisition device, that the OES data is stored as the time series data group in the learning data storage 163, and that the condition is adjusted to a constant condition using a cleaning recipe.

The emission spectrophotometer 1140 measures the OES data in association with the processing of the pre-processing wafer 110 in the chamber A by emission spectroscopy analysis techniques. The OES data is, for example, time series data indicating the emission intensity of each wavelength included in the wavelength range of visible light at each time.

The cleaning recipe is a recipe used when cleaning the inside of the chamber A and is a recipe for adjusting the condition of the chamber A to a constant condition from the viewpoint of the type of a deposit adhering to the chamber A or the amount of the deposit.

Specific Example of OES Data

Figure 12:
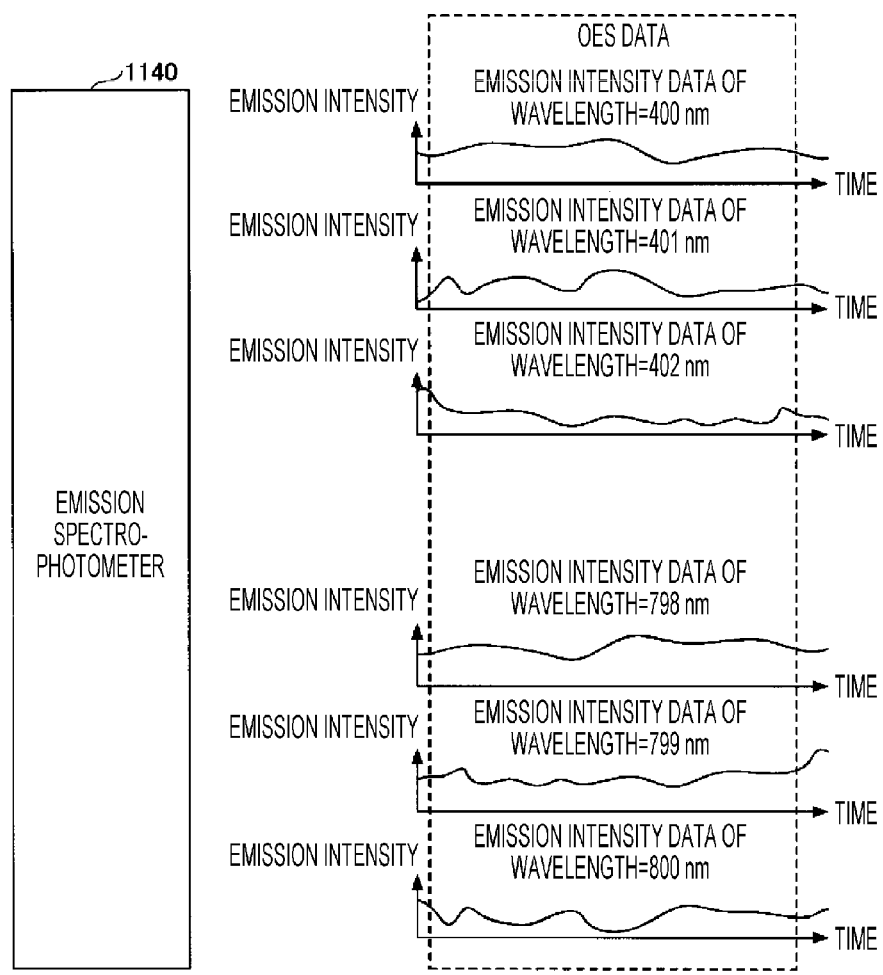
FIG. 12 is a diagram illustrating an example of OES data.

Next, a specific example of the OES data measured by the emission spectrophotometer 1140 will be described. FIG. 12 is a diagram illustrating an example of OES data, and illustrates an emission intensity data group in a case where each wavelength included in the wavelength range of visible light (from 400 nm to 800 nm) is measured in 1 nm increments. In FIG. 12, the horizontal axis represents the time and the vertical axis represents the emission intensity of each wavelength.

In the case of FIG. 12, for example, the uppermost graph illustrates emission intensity data at each time of the wavelength=400 nm, and the graph in the second row illustrates emission intensity data at each time of the wavelength=401 nm. Further, the graph in the third row of FIG. 12 illustrates emission intensity data at each time of the wavelength=402 nm.

Specific Example of Processing by Evaluation Unit

Figure 13:
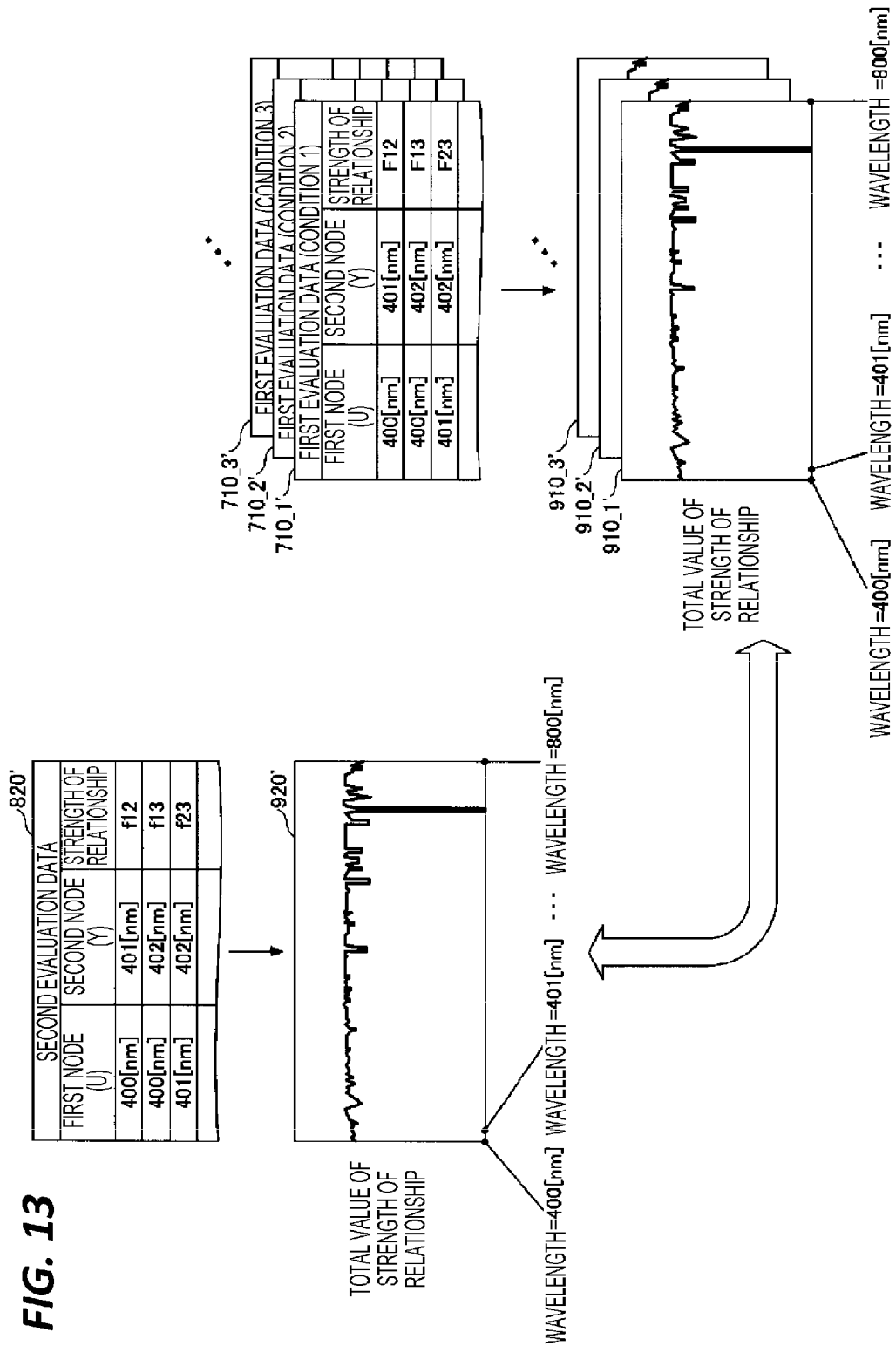
FIG. 13 is a diagram illustrating a specific example of a processing by an evaluation unit when OES data is used.

Next, a specific example of a processing by the evaluation unit 162 when the OES data is used will be described. FIG. 13 is a diagram illustrating a specific example of a processing by an evaluation unit when OES data is used.

As illustrated in FIG. 13, when the OES data is used as the time series data group, the emission intensity data of each wavelength is stored in the time series data of the "first node" and the "second node" of the first evaluation data 710_1', 710_2', 710_3', . . . .

Further, as represented in the first evaluation data 710_1',
the value indicating the strength of a relationship between the emission intensity data at each time of the wavelength=400 nm and the emission intensity data at each time of the wavelength 401 nm is "F12";
the value indicating the strength of a relationship between the emission intensity data at each time of the wavelength=400 nm and the emission intensity data at each time of the wavelength 402 nm is "F13m" and
the value indicating the strength of a relationship between the emission intensity data at each time of the wavelength=401 nm and the emission intensity data at each time of the wavelength 402 nm is "F23."
As illustrated in FIG. 13, when the OES data is used as the time series data group, the horizontal axis of graphs 910_1', 910_2', 910_3', . . . represents each wavelength included in the wavelength range of visible light (from 400 nm to 800 nm).

Similarly, when the OES data is used as the time series data group, the emission intensity data of each wavelength is stored in the time series data of the "first node" and the "second node" of the second evaluation data 820'.

Further, as represented in the second evaluation data 820',
the value indicating the strength of a relationship between the emission intensity data at each time of the wavelength=400 nm and the emission intensity data at each time of the wavelength 401 nm is "f12,"
the value indicating the strength of a relationship between the emission intensity data at each time of the wavelength=400 nm and the emission intensity data at each time of the wavelength 402 nm is "f13," and
the value indicating the strength of a relationship between the emission intensity data at each time of the wavelength=401 nm and the emission intensity data at each time of the wavelength 402 nm is "f23."
When the OES data is used as the time series data group, the horizontal axis of a graph 920' represents each wavelength included in the wavelength range of visible light (from 400 nm to 800 nm).

The similarity calculator 802 calculates the similarity by the same calculation method as in the first embodiment, and evaluates the condition by the same evaluation method as in the first embodiment.

However, although not mentioned in the first embodiment, a situation where the second evaluation data 820' has low similarity to any of the first evaluation data 710_1', 710_2', 710_3', . . . may occur. Alternatively, a situation where the graph 920' has low similarity to any of the graphs 910_1', 910_2', 910_3', . . . may occur.

In such a case, the evaluation unit 162 of the analysis device 160 determines that the condition of the chamber A is not normal from the viewpoint of the type of a deposit adhering to the chamber A or the amount of the deposit. That is, it is assumed that the evaluation unit 162 of the analysis device 160 may not only determine that the condition of the chamber A corresponds to which of predefined conditions, but also determine whether or not the condition is normal.

<Relationship Between Total Value of Values Indicating Strength of Relationship Between Respective Wavelengths of OES Data and Emission Intensity of Each Wavelength>

Figure 14:
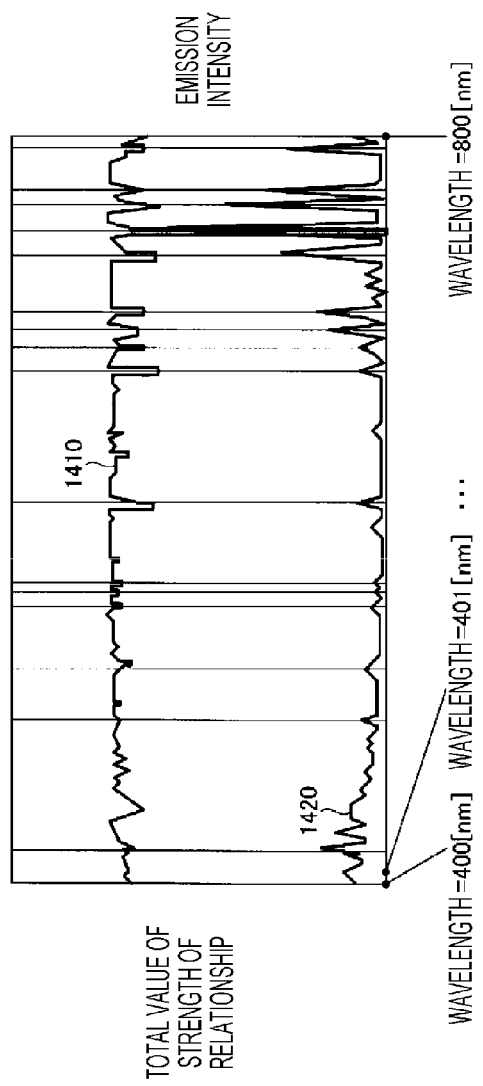
FIG. 14 is a diagram illustrating a relationship between the total value of values indicating the strength of a relationship between respective wavelengths of OES data and the emission intensity of each wavelength.

Next, a relationship between the total value of values indicating the strength of a relationship between the respective wavelengths of OES data and the emission intensity of each wavelength will be described. FIG. 14 is a diagram illustrating a relationship between the total value of values indicating the strength of a relationship between respective wavelengths of OES data and the light emission intensity of each wavelength.

In FIG. 14, a graph 1410 represents the total value of values indicating the strength of a relationship between the respective wavelengths. Meanwhile, a graph 1420 represents the maximum emission intensity at each wavelength.

As is clear from the comparison between the graph 1410 and the graph 1420, the total value of values indicating the strength of a relationship between the respective wavelengths is low at the wavelength at which the emission intensity peaks.

Here, the learning unit 161 uses the emission intensity data of the wavelength having a large total value of values indicating the strength of a relationship between the respective wavelengths when evaluating the condition of the chamber A. In other words, the learning unit 161 evaluates the condition using the emission intensity data of the wavelength at which the emission intensity does not peak. This is a major difference from a general evaluation method of evaluating the condition of the chamber using the OES data which uses the emission intensity data of the wavelength at which the emission intensity peaks.

That is, it can be said that the analysis device 160 according to the present embodiment evaluates the condition of the chamber A using the OES data by a different evaluation method from the related art.

Specific Example of Condition Adjustment Method

Next, a specific example of a condition adjustment method will be described. FIG. 15 is a diagram illustrating a specific example of a condition adjustment method when OES data is used to evaluate the condition. As described above, when the condition is evaluated using the OES data, the control device 170 adjusts the condition to a constant condition using a cleaning recipe.

At that time, the control device 170 refers to a condition adjustment parameter determination table 1500 illustrated in FIG. 15. As illustrated in FIG. 15, the condition adjustment parameter determination table 1500 contains, as information items, "current condition," "recipe according to condition," and "cleaning recipe."

In the "current condition," information indicating the current condition of the chamber A, which is output from the evaluation unit 162 of the analysis device 160, is stored.

In the "recipe according to the condition," a recipe according to the current condition of the chamber A, which is used when adjusting the condition of the chamber A, is stored.

In the "cleaning recipe," a predetermined cleaning recipe used when cleaning the inside of the chamber A is stored.

The control device 170 adjusts the inside of the chamber A to a constant condition by adjusting the condition of the chamber A using a recipe according to the evaluated current condition, and then cleaning the inside of the chamber A using a predetermined cleaning recipe.

However, a method of adjusting the condition to a constant condition using a cleaning recipe is not limited to this. For example, a processing of cleaning the inside of the chamber A using a predetermined cleaning recipe may also serve as a processing of adjusting the condition of the chamber A using a recipe according to the condition.

Specifically, the inside of the chamber A may be adjusted to a constant condition by adjusting the processing time of a processing of cleaning the inside of the chamber A using a predetermined cleaning recipe, instead of performing a processing of adjusting the condition of the chamber A using a recipe according to the condition.

<Summary>
As is clear from the above description, the analysis device according to the second embodiment is configured to:
  perform machine learning using the OES data measured in association with the processing of the pre-processing water in the chamber, and calculate a value indicating the strength of a relationship between the emission intensity data in the corresponding time range between respective wavelengths; and
  evaluate an unknown condition of the chamber based on the value indicating the strength of the relationship calculated by performing machine learning using each OES data measured in association with the processing of the pre-processing wafer under a plurality of known conditions of the chamber.

Thus, according to the analysis device of the second embodiment, the condition of the chamber in the semiconductor manufacturing process may be quantitatively evaluated from the viewpoint of the type of a deposit adhering to the chamber or the amount of the deposit based on the OES data.

In the second embodiment, a case where the time series data acquisition device is the emission spectrophotometer and the time series data group is the OES data has been described, but the time series data acquisition device may be a mass spectrometer (e.g., a quadrupole mass spectrometer). In this case, the time series data group is a data set of time series data (mass spectrometry data) of detection intensities in the same number as the types of values (m/z values) related to the mass.

Third Embodiment

In the second embodiment described above, the case where the time series data group is the OES data has been described. However, the time series data group is not limited to the OES data, and may be, for example, a process data group measured by various process sensors (e.g., RF power supply data, pressure data, and temperature data).

Here, process data has been known as correlating with the degree of wear (or the degree of deterioration) of each part in the chamber. Therefore, by using the process data group as the time series data group, the condition of the chamber may be evaluated from the viewpoint of the degree of wear (or the degree of deterioration) of each part in the chamber. Hereinafter, a third embodiment will be described focusing on the differences from the first or second embodiment.

<System Configuration of Condition Adjustment System>

Figure 16:
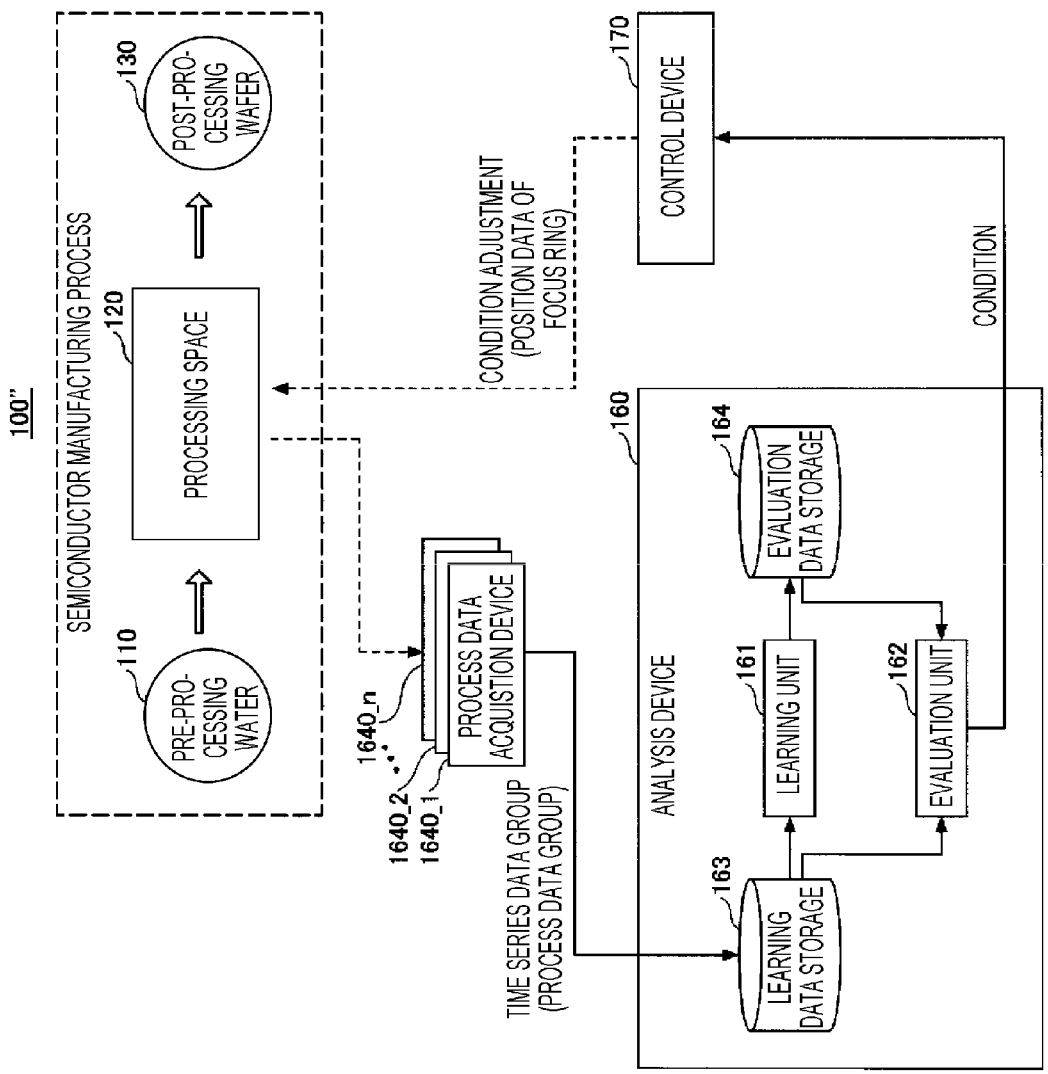
FIG. 16 is a diagram illustrating an example of a system configuration of a condition adjustment system when a process data group is used.

First, a system configuration of a condition adjustment system will be described. FIG. 16 is a diagram illustrating an example of a system configuration of a condition adjustment system when a process data group is used. The difference from FIG. 1 is that process data acquisition devices 1640_1, 1640_2, . . . 1640_n are arranged as the time series data acquisition devices. Further, the differences from FIG. 1 are that the process data group is stored in the learning data storage 163 as the time series data group and that the inside of the chamber is adjusted to a constant condition using, for example, position data of a focus ring.

The process data acquisition devices 1640_1, 1640_2, . . . 1640_n measure the process data group in association with the processing of the pre-processing wafer 110 in the corresponding chamber A. The process data group contains, for example, RF power supply data, pressure data, gas flow rate data, current data, GAP length data, and temperature data at each time.

For example, the position data of the focus ring is position data after a change when the position in the height direction of the focus ring is changed based on the degree of wear of the focus ring which is an example of a part in the chamber A. For example, the position data of the focus ring is data for adjusting the condition in the chamber A to a constant condition.

Specific Example of Process Data Group

Figure 17:
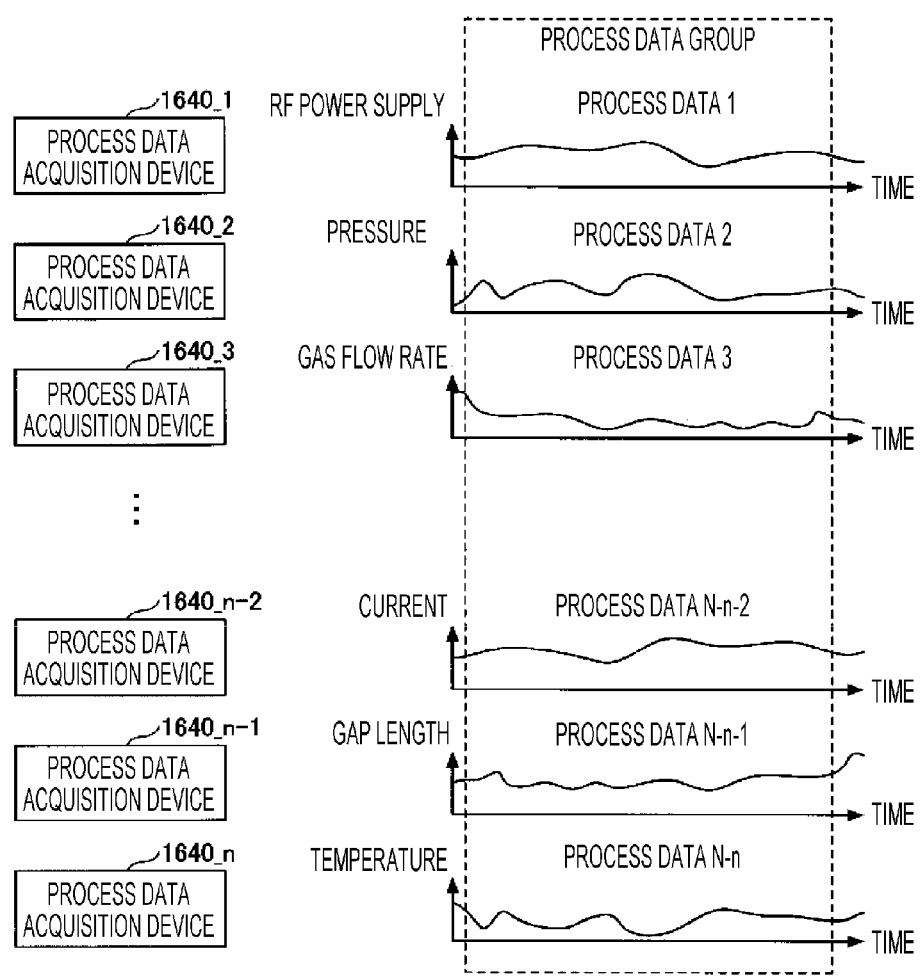
FIG. 17 is a diagram illustrating an example of a process data group.

Next, a specific example of the process data group measured by the process data acquisition devices 1640_1, 1640_2, . . . 1640_n will be described. FIG. 17 is a diagram illustrating an example of a process data group. The example of FIG. 17 illustrates a state where the process data acquisition device 1640_1 measures RF power supply data as process data 1 and the process data acquisition device 1640_2 measures pressure data as process data 2. Further, the example of FIG. 17 illustrates a state where the process data acquisition device 1640_3 measures gas flow rate data as process data 3.

Similarly, the example of FIG. 17 illustrates a state where the process data acquisition device 1640_$n$-2 measures current data as process data n-2 and the process data acquisition device 1640_$n$-1 measures GAP length data as process data n-1. Further, the example of FIG. 17 illustrates a state where the process data acquisition device 1640_$n$ measures temperature data as process data n.

Specific Example of Processing by Evaluation Unit

Figure 18:
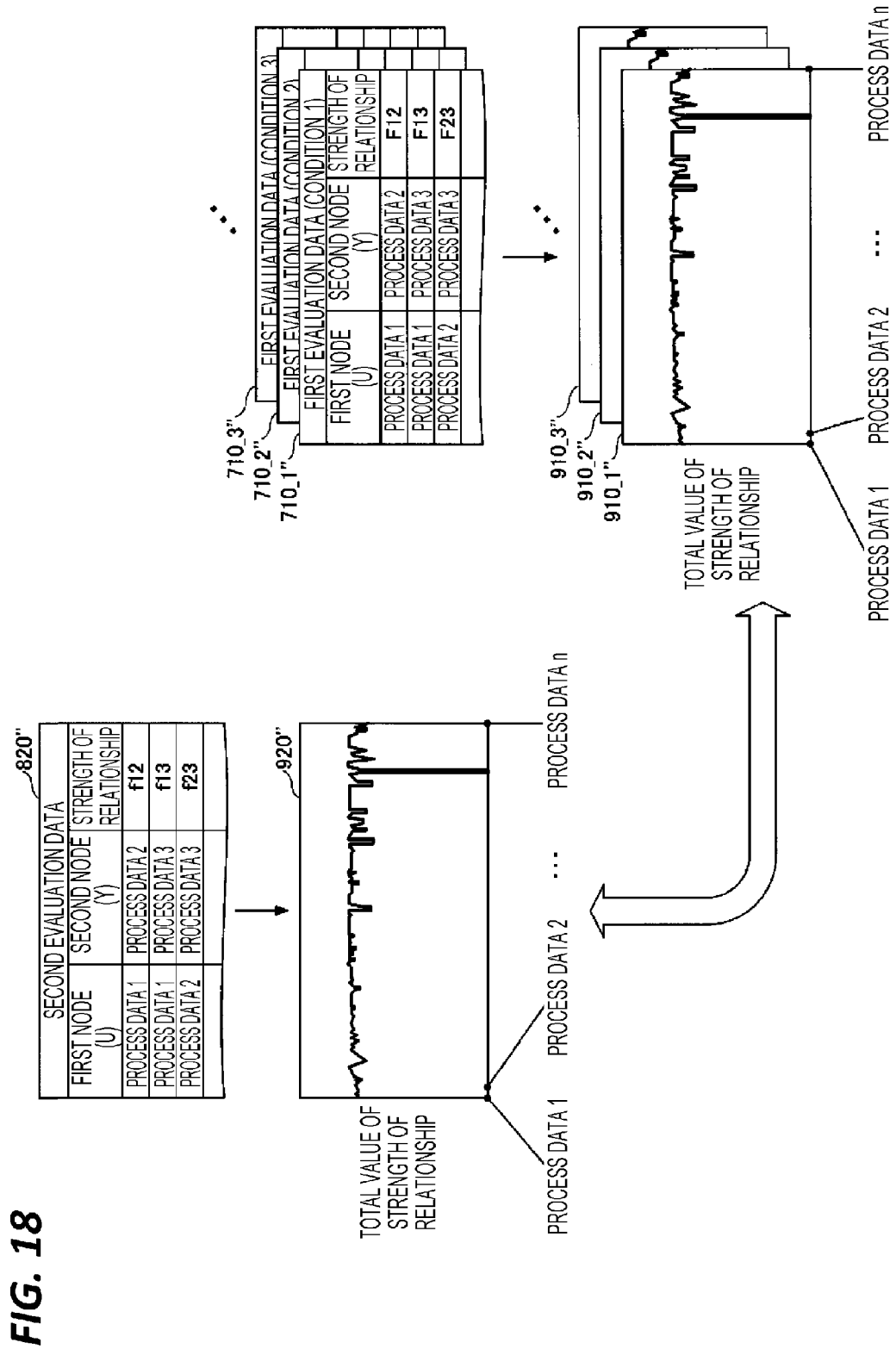
FIG. 18 is a diagram illustrating a specific example of a processing by an evaluation unit when process data is used.

Next, a specific example of a processing by the evaluation unit 162 when the process data group is used will be described. FIG. 18 is a diagram illustrating a specific example of a processing by an evaluation unit when a process data group is used.

As illustrated in FIG. 18, when the process data group is used as the time series data group, the process data of each measurement item is stored in the time series data of the "first node" and the "second node" of the first evaluation data 710_1", 710_2", 710_3", . . . .

Further, as represented in the first evaluation data 710_1",
the value indicating the strength of a relationship between the process data 1 and the process data 2 is "F12,"
the value indicating the strength of a relationship between the process data 1 and the process data 3 is "F13," and
the value indicating the strength of a relationship between the process data 2 and the process data 3 is "F23."

As illustrated in FIG. 18, when the process data group is used as the time series data group, the horizontal axis of graphs 910_1", 910_2", 910_3", . . . represents each measurement item.

Similarly, when the process data group is used as the time series data group, the process data of each measurement item is stored in the time series data of the "first node" and the "second node" of second evaluation data 820".

Further, as represented in the second evaluation data 820",
the value indicating the strength of a relationship between the process data 1 and the process data 2 is "f12,"
the value indicating the strength of a relationship between the process data 1 and the process data 3 is "f13," and
the value indicating the strength of a relationship between the process data 2 and the process data 3 is "f23."

As illustrated in FIG. 18, when the process data group is used as the time series data group, the horizontal axis of the graph 920" represents each measurement item.

The similarity calculator 802 calculates the similarity by the same calculation method as in the first embodiment, and evaluates the condition by the same evaluation method as in the first embodiment.

However, although not mentioned in the first embodiment, a situation where the second evaluation data 820" has low similarity to any of the first evaluation data 710_1", 710_2", 710_3", . . . may occur. Alternatively, a situation where the graph 920" has low similarity to any of the graphs 910_1", 910_2", 910_3", . . . may occur.

In such a case, the evaluation unit 162 of the analysis device 160 determines that the condition of the chamber A is not normal from the viewpoint of the degree of wear of each part in the chamber A. That is, it is assumed that the evaluation unit 162 of the analysis device 160 may not only determine that the condition of the chamber A corresponds to which of predefined conditions, but also determine whether or not the condition is normal.

Specific Example of Condition Adjustment Method

Next, a specific example of a condition adjustment method will be described. FIG. 19 is a diagram illustrating a specific example of a condition adjustment method when a process data group is used to evaluate the condition. As described above, when the condition is evaluated using the process data group, the control device 170 adjusts the condition to a constant condition using the position data of the focus ring.

At that time, the control device 170 refers to a condition adjustment parameter determination table 1900 illustrated in FIG. 19. As illustrated in FIG. 19, the condition adjustment parameter determination table 1900 contains, as information items, "current condition," "focus ring position," and "applied voltage."

In the "current condition," information indicating the current condition of the chamber A, which is output from the evaluation unit 162 of the analysis device 160, is stored.

In the "focus ring position," position data after a change when the position in the height direction of the focus ring is changed according to the evaluated condition (the degree of wear of each part) is stored.

In the "applied voltage," the applied voltage data when a voltage is applied instead of changing the position of the focus ring is stored.

When the analysis device 160 notifies the control device 170 of information indicating the current condition, the control device 170 refers to the condition adjustment parameter determination table 1900 to determine the position data of the focus ring when the position of the focus ring is changeable. Further, when the position of the focus ring is not changeable, the control device 170 determines the applied voltage data. Further, the control device 170 adjusts the chamber A to a constant condition using the determined position data or voltage data.

According to the example of FIG. 19, for example, when the current condition is the "condition 1," the control device 170 determines the focus ring position="position 1" or the applied voltage="DC1."

<Summary>

As is clear from the above description, the analysis device according to the third embodiment is configured to:
perform machine learning using the process data group measured in association with the processing of the pre-processing wafer in the chamber, and calculate a value indicating the strength of a relationship of process data in the corresponding time range between respective measurement items; and
evaluate an unknown condition of the chamber based on the value indicating the strength of a relationship calculated by performing machine learning using each process data group measured in association with the processing of the pre-processing wafer under a plurality of known conditions of the chamber.

Thus, according to the analysis device of the third embodiment, the condition of the chamber in the semiconductor manufacturing process may be quantitatively evaluated from the viewpoint of the degree of wear of each part in the chamber based on the process data group.

Fourth Embodiment

In the second and third embodiments, it has been described that it is determined that the condition of the chamber is not normal when the second evaluation data has low similarity to any of the plurality of first evaluation data. That is, in the second and third embodiments, it has been described that the presence or absence of deviation from the normal condition is determined based on a value indicating the strength of a relationship between the time series data.

However, a value used for determining whether or not the condition of the chamber is normal is not limited to the value indicating the strength of a relationship between the time series data. For example, it may be a predetermined count value that may be calculated by executing the regression model. Hereinafter, a fourth embodiment will be described focusing on the differences from the first to third embodiments.

<System Configuration of Condition Adjustment System>

Figure 20:
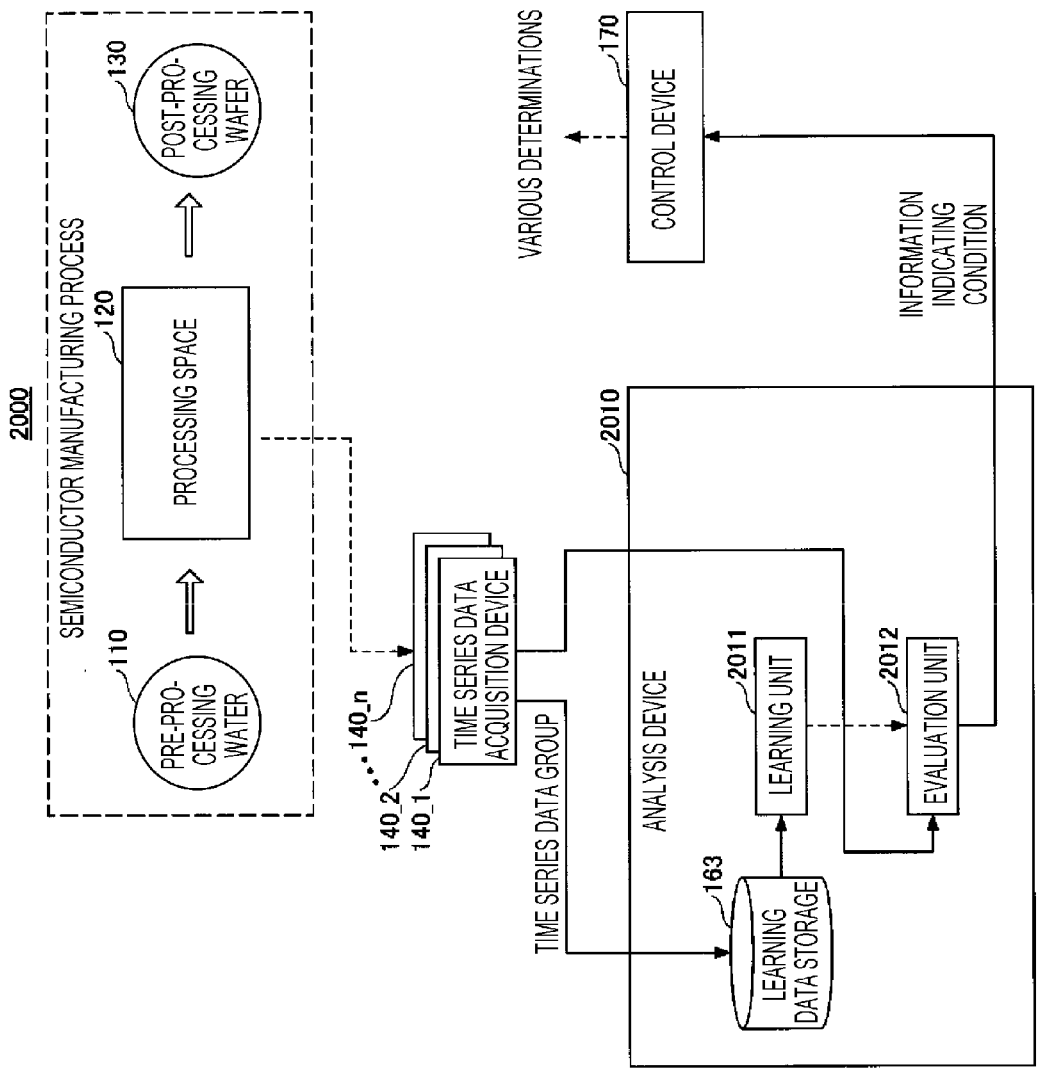
FIG. 20 is a second diagram illustrating an example of a system configuration of a condition adjustment system.

First, a system configuration of a condition adjustment system will be described. FIG. 20 is a second diagram illustrating an example of a system configuration of a condition adjustment system. The differences from FIG. 1 are that, in the case of a condition adjustment system 2000, the function of a learning unit 2011 of an analysis device 2010 is different from the function of the learning unit 161 and that the function of an evaluation unit 2012 is different from the function of the evaluation unit 162. Further, the difference from FIG. 1 is that, in the case of the condition adjustment system 2000, the analysis device 2010 does not have an evaluation data storage.

The learning unit 2011 performs machine learning for the regression model using the learning data.

The evaluation unit 2012 calculates a predetermined count value by inputting the time series data group (inference data) measured under an unknown condition to the regression model generated as the learning unit 161 performs machine learning using the learning data.

The evaluation unit 2012 counts the number of combinations in which the first node and the second node have a predetermined relationship among the combinations of the first node and the second node. The above-mentioned predetermined count value is the number of combinations in which the predetermined relationship is destroyed (a value indicating the strength of a relationship being equal to or less than a predetermined threshold) among the combinations in which the first node and the second node have a predetermined relationship.

In the calculation of the predetermined count value, first, the evaluation unit 2012 acquires the regression model generated by the learning unit 2011 as machine learning is performed using the time series data group (learning data) measured under a normal condition. In succession, the evaluation unit 2012 inputs the time series data group (inference data) measured under an unknown condition to the acquired regression model to calculate the predetermined count value. Thus, according to the evaluation unit 2012, it is possible to determine whether or not the condition of the chamber A is normal (or the degree of abnormality of the chamber A).

Based on information indicating the condition output from the evaluation unit 2012 (whether or not the chamber A being normal (or the degree of abnormality of the chamber A)), it determines, for example, the necessity of maintenance of the chamber A, the necessity of maintenance of a part in the chamber A, and the necessity of maintenance of a part affecting the chamber A, or the timing of maintenance of the chamber A, the timing of maintenance of a part in the chamber A, and the timing of maintenance of a part affecting the chamber A.

Specific Example of Processing by Learning Unit

Figure 21:
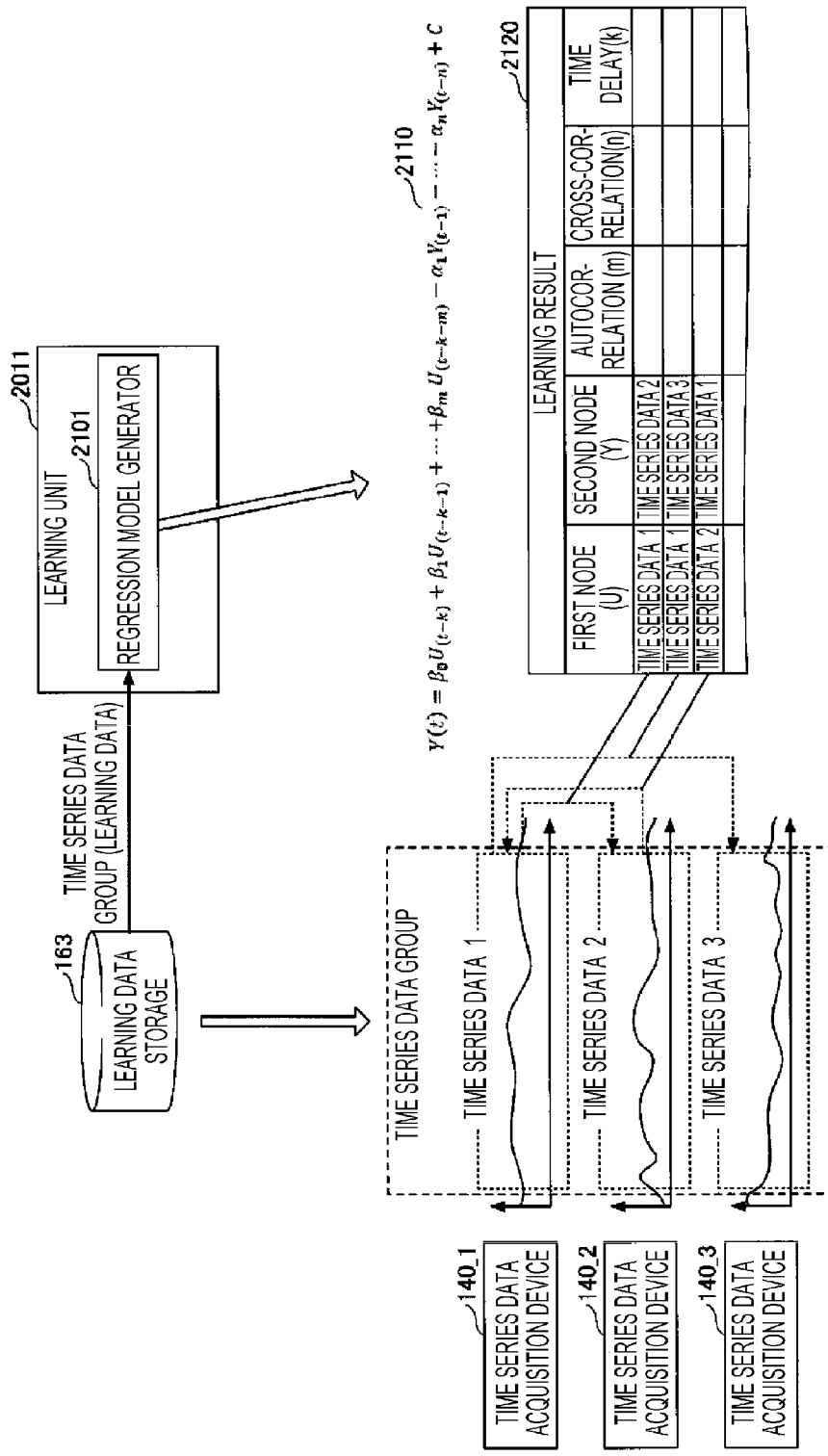
FIG. 21 is a third diagram illustrating a specific example of a processing by a learning unit.

Next, a specific example of a processing by the learning unit 2011 of the analysis device 2010 will be described. FIG. 21 is a third diagram illustrating a specific example of a processing by a learning unit. As illustrated in FIG. 21, the learning unit 2011 has a regression model generator 2101.

The regression model generator 2101 performs machine learning for the regression model using the time series data group included in the learning data stored in the learning data storage 163. Thus, the regression model generator 2101 defines a relationship of time series data between measurement items measured by each time series data acquisition devices 140_1 to 140_n using the mathematical formula illustrated in reference numeral 2110.

Specifically, the regression model generator 2101 calculates each parameter of the formula illustrated in reference numeral 2110 so that the time series data of the second node is derived by inputting the time series data of the first node to the formula illustrated in reference numeral 2110.

As represented in the formula illustrated in reference numeral 2110, t: time, m: autocorrelation (parameter indicating the presence or absence of periodicity), n: cross-correlation (parameter indicating whether or not two are related to each other), k: time delay, $\beta$, $\alpha$, and C: predetermined coefficients.

In FIG. 21, the learning result 2120 illustrates each parameter of the formula illustrated in reference numeral 2110, which is calculated by performing machine learning for the regression model. Specifically, the learning result 2120 contains, as information items, "first node," "second node," and "autocorrelation," "cross-correlation," and "time delay" which are other examples of the value indicating a relationship.

In the learning result 2120, the time series data used to derive the formula illustrated in reference numeral 2110 among the time series data group included in the learning data are stored respectively in the "first node" and the "second node."

Further, in the learning result 2120, the respective parameters m, n, and k which are calculated so that the time series data of the second node is derived by inputting the time series data of the first node to the formula illustrated in reference numeral 2110 are stored in the "autocorrelation," the "cross-correlation," and the "time delay."

As illustrated in FIG. 21, only one learning result 2120 is generated for the learning data containing the time series data group measured under a normal condition.

Specific Example of Processing by Evaluation Unit

Figure 22:
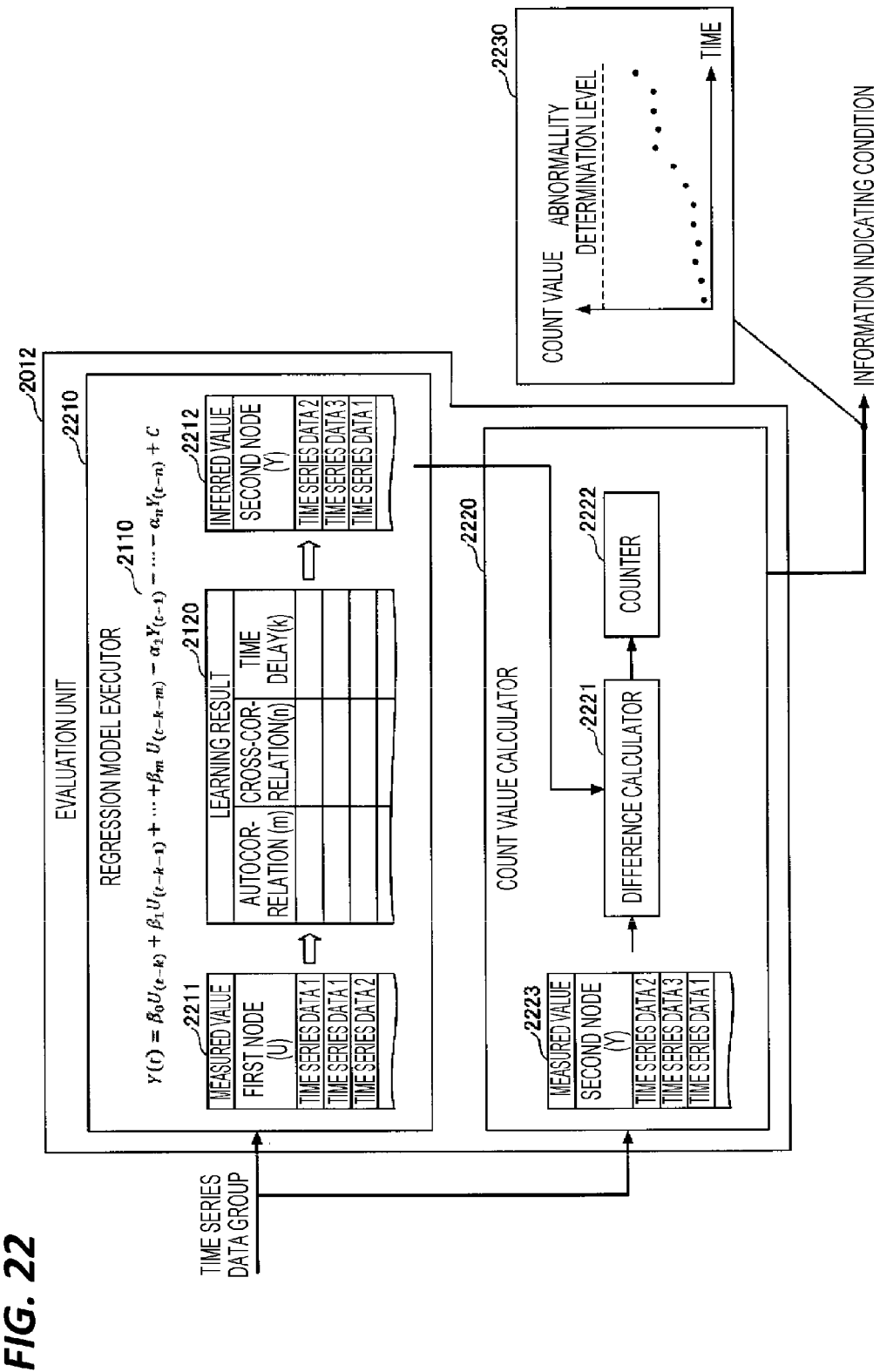
FIG. 22 is a third diagram illustrating a specific example of a processing by an evaluation unit.

Next, a specific example of a processing by the learning unit 2012 of the analysis device 2010 will be described. FIG. 22 is a third diagram illustrating a specific example of a processing by an evaluation unit. As illustrated in FIG. 22, the evaluation unit 2012 has a regression model executor 2210 and a count value calculator 2220.

The regression model executor 2210 extracts the time series data (measured value 2211) of the first node from the time series data group (inference data) measured under an unknown condition of the chamber A. Further, the regression model executor 2210 infers the time series data (inferred value 2212) of the second node by inputting the extracted time series data of the first node to the formula illustrated in reference numeral 2110.

At this time, the regression model executor 2210 reads out the respective parameters m, n, and k corresponding to the time series data input to the formula illustrated in reference numeral 2110 from the learning result 2120, sets them in the formula illustrated in reference numeral 2110, and then infers the time series data of the second node.

In FIG. 22, the measured value 2211 indicates the time series data of the first node input to the formula illustrated in reference numeral 2110 of the time series data group (inference data) measured under the unknown condition of the chamber A. Further, the inferred value 2212 indicates the time series data of the second node inferred by inputting the measured value 2211.

Meanwhile, the count value calculator 2220 includes a difference calculator 2221 and a counter 2222.

The difference calculator 2221 extracts the time series data (measured value 2223) of the second node from the time series data group (inference data) measured under the unknown condition of the chamber A. Further, the difference calculator 2221 acquires the inferred value 2212 from the regression model executor 2210. Further, the difference calculator 2221 calculates the difference between the measured value 2223 and the inferred value 2212.

The counter 2222 counts the number of first nodes (i.e., a predetermined count value) in which the difference calculated by the difference calculator 2221 is equal to or greater than a predetermined threshold. Further, the counter 2222 outputs the counted predetermined count value as information indicating the condition of the chamber A (information indicating whether or not the condition is normal (or the degree of abnormality)).

In FIG. 22, in a graph 2230, the horizontal axis represents the time and the vertical axis represents a predetermined count value output by the counter 2222. As illustrated in the graph 2230, it can be said that the predetermined count value is information indicating that the chamber A is in a normal condition when the predetermined count value output by the counter 2222 is less than the level indicated by the broken line (abnormality determination level).

Meanwhile, it can be said that the predetermined count value is information indicating that the chamber A is not in a normal condition when the count value output by the counter 2222 reaches the abnormality determination level.

The predetermined count value output by the counter 2222 may be compared with the abnormality determination level, thereby being regarded as information indicating the degree of abnormality in the condition of the chamber A. Alternatively, the predetermined count value output by the counter 2222 may be used to predict the timing when the count value reaches the abnormality determination level, thereby being regarded as information for predicting the timing when the condition of the chamber A becomes abnormal.

<Flow of Condition Adjustment Processing>

Figure 23:
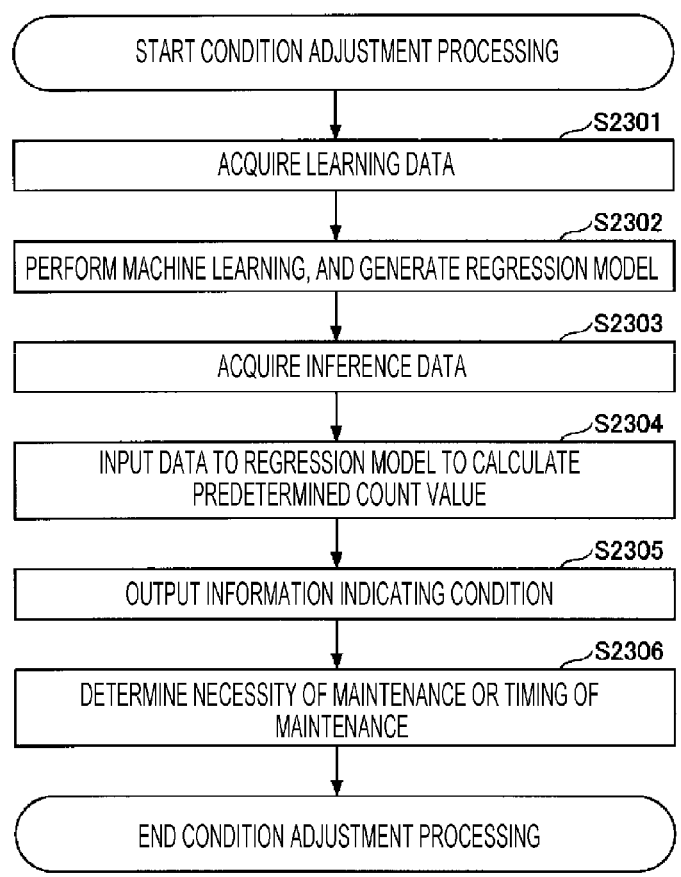
FIG. 23 is a third flowchart illustrating the flow of a condition adjustment processing.

Next, the flow of the entire condition adjustment processing by the condition adjustment system 2000 will be described. FIG. 23 is a third flowchart illustrating the flow of a condition adjustment processing.

In step S2301, the time series data acquisition devices 140_1 to 140_n measure the time series data group in association with the processing of the pre-processing wafer in the chamber A, and store the time series data group in the learning data storage 163. The time series data acquisition devices 140_1 to 140_n store the time series data group measured in association with the processing under a normal condition of the chamber A as the learning data.

In step S2302, the learning unit 2011 of the analysis device 2010 performs machine learning for the regression model using the learning data stored in the learning data storage 163.

In step S2303, the time series data acquisition devices 140_1 to 140_n measure the time series data group in association with the processing of the pre-processing wafer in the chamber A. The time series data acquisition devices 140_1 to 140_n measure the time series data group (inference data) in association with the processing under an unknown condition of the chamber A.

In step S2304, the evaluation unit 2012 of the analysis device 2010 inputs the time series data group (inference data) measured in step S2303 to the regression model, and calculates a predetermined count value.

In step S2305, the evaluation unit 2012 of the analysis device 2010 outputs the calculated predetermined count value to the control device 170 as information indicating the condition of the chamber A.

In step S2306, the control device 170 determines, for example, the necessity of maintenance or the maintenance timing based on the information indicating the condition.

<Summary>

As is clear from the above description, the analysis device according to the fourth embodiment is configured to:
perform machine learning for the regression model using the time series data group measured in association with the processing of the pre-processing wafer in the chamber, and calculate autocorrelation, cross-correlation, and time delay which are other examples of the value indicating a relationship of the time series data in the corresponding time range between respective measurement items; and
calculate a predetermined count value by inputting the time series data group (inference data) measured in association with the processing of the pre-processing wafer under an unknown condition of the chamber to the regression model, and output the predetermined count value as information indicating the condition of the chamber.

Thus, according to the analysis device of the fourth embodiment, whether or not the condition of the chamber in the semiconductor manufacturing process is normal (or the degree of abnormality) may be quantitatively evaluated based on the time series data group.

Fifth Embodiment

In the fourth embodiment, the configuration in which a predetermined count value is calculated by inputting the time series data group measured in association with the processing of the pre-processing wafer to the regression model and information indicating the condition of the chamber is output has been described.

Meanwhile, in a fifth embodiment, a predetermined count value is calculated by inputting the time series data group to the regression model, and a change in the predetermined count value is monitored. Thus, in the fifth embodiment, the change in the condition of the chamber is grasped to detect the end point of an etching processing or a cleaning processing.

<System Configuration of End Point Detection System>

Figure 24:
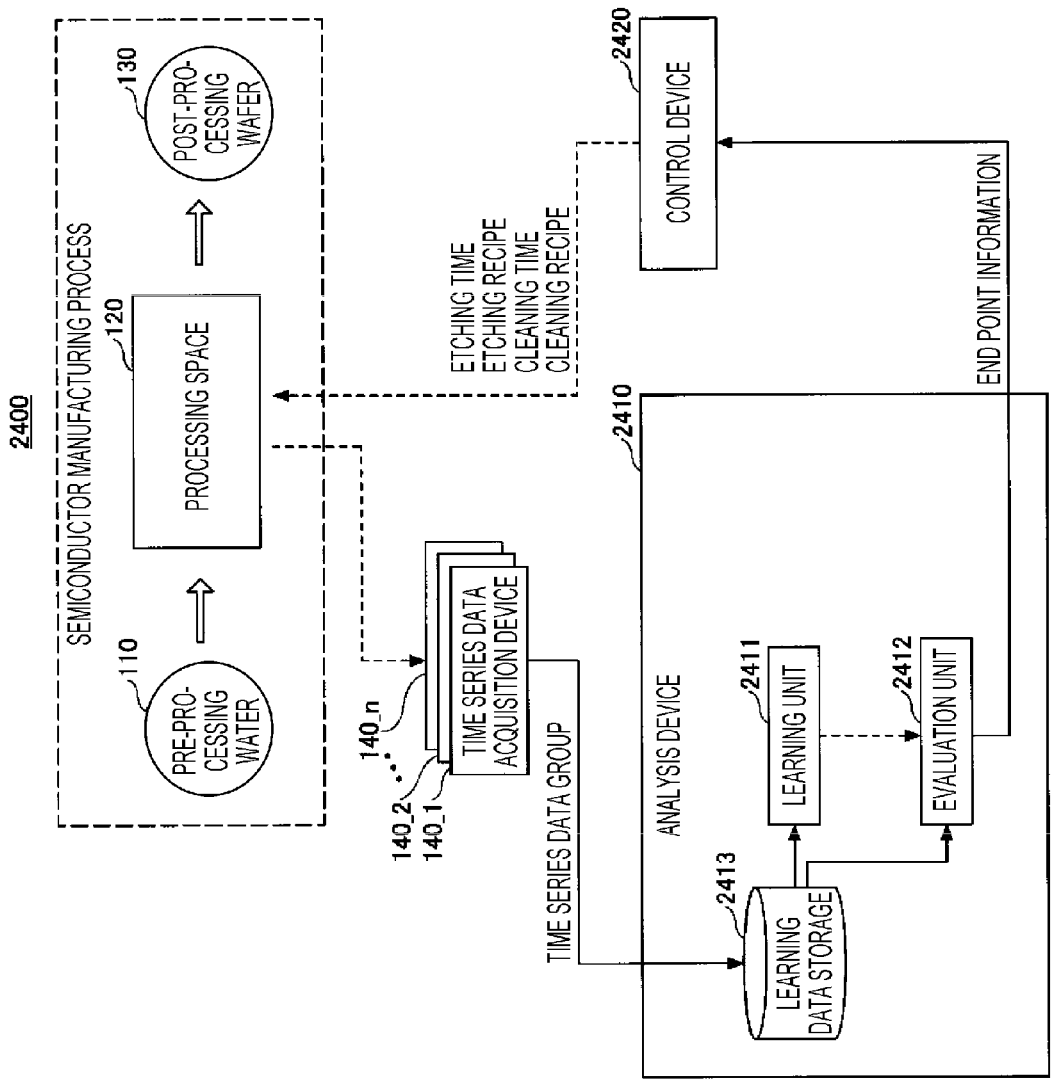
FIG. 24 is a diagram illustrating an example of a system configuration of an end point detection system.

First, a system configuration of an end point detection system will be described. FIG. 24 is a diagram illustrating an example of a system configuration of an end point detection system. The difference from the condition adjustment system 100 illustrated in FIG. 1 is that, in the case of the end point detection system 2400, an analysis device 2410 has a different function and a control device 2420 has a different function.

As illustrated in FIG. 24, the analysis device 2410 functions as a learning unit 2411 and an end point detection unit 2412. The learning unit 2411 and the end point detection unit 2412 have two functions, and perform end point detection by any of the functions.

(i) Description of a First Function of the Learning Unit and the End Point Detection Unit The learning unit 2411 performs machine learning for the regression model using the time series data group (learning data) which is the time series data group measured by the time series data acquisition devices 140_1 to 140_n and which is measured at the time point at which the etching processing is completed in the processing space 120, or the time point at which the cleaning processing is completed in the processing space 120.

The end point detection unit 2412 calculates a "predetermined count value" by inputting the time series data group (detection data) measured during the etching processing in the processing space 120, or the time series data group (detection data) measured during the cleaning processing in the processing space 120 to the regression model generated as the learning unit 2411 performs machine learning using the learning data.

Then, the end point detection unit 2412 detects the time point at which the predetermined count value changes to or less than a predetermined threshold as the end point of the etching processing or the end point of the cleaning processing. Further, the end point detection unit 2412 transmits end point information such as the detected end point of the etching processing or the detected end point of the cleaning processing to the control device 2420.

The end point detection unit 2412 counts the number of combinations in which the first node and the second node have a predetermined relationship among the combinations of the first node and the second node. The above-mentioned "predetermined count value" is the number of combinations in which the predetermined relationship is destroyed (a value indicating the strength of a relationship being equal to or less than a predetermined threshold) among the combinations in which the first node and the second node have a predetermined relationship.

(ii) Description of a Second Function of the Learning Unit and the End Point Detection Unit The learning unit 2411 performs machine learning for the regression model using the time series data group (learning data) which is the time series data group measured by the time series data acquisition devices 140_1 to 140_n and which is measured at the time point at which the etching processing is started in the processing space 120, or the time point at which the cleaning processing is started in the processing space 120.

The end point detection unit 2412 calculates a "predetermined count value" by inputting the time series data group (detection data) measured during the etching processing in the processing space 120, or the time series data group (detection data) measured during the cleaning processing in the processing space 120 to the regression model generated as the learning unit 2411 performs machine learning using the learning data.

Then, the end point detection unit 2412 detects the time point at which the predetermined count value changes to or greater than a predetermined threshold as the end point of the etching processing or the end point of the cleaning processing. Further, the end point detection unit 2412 transmits end point information such as the detected end point of the etching processing or the detected end point of the cleaning processing to the control device 2420.

(iii) Description of the Function of the Control Device

The control device 2420 adjusts, for example, the etching time and the etching recipe, or the cleaning time and the cleaning recipe based on the end point information output from the end point detection unit 2412 of the analysis device 2410.

Specific Example of Processing by Learning Unit

Figure 25:
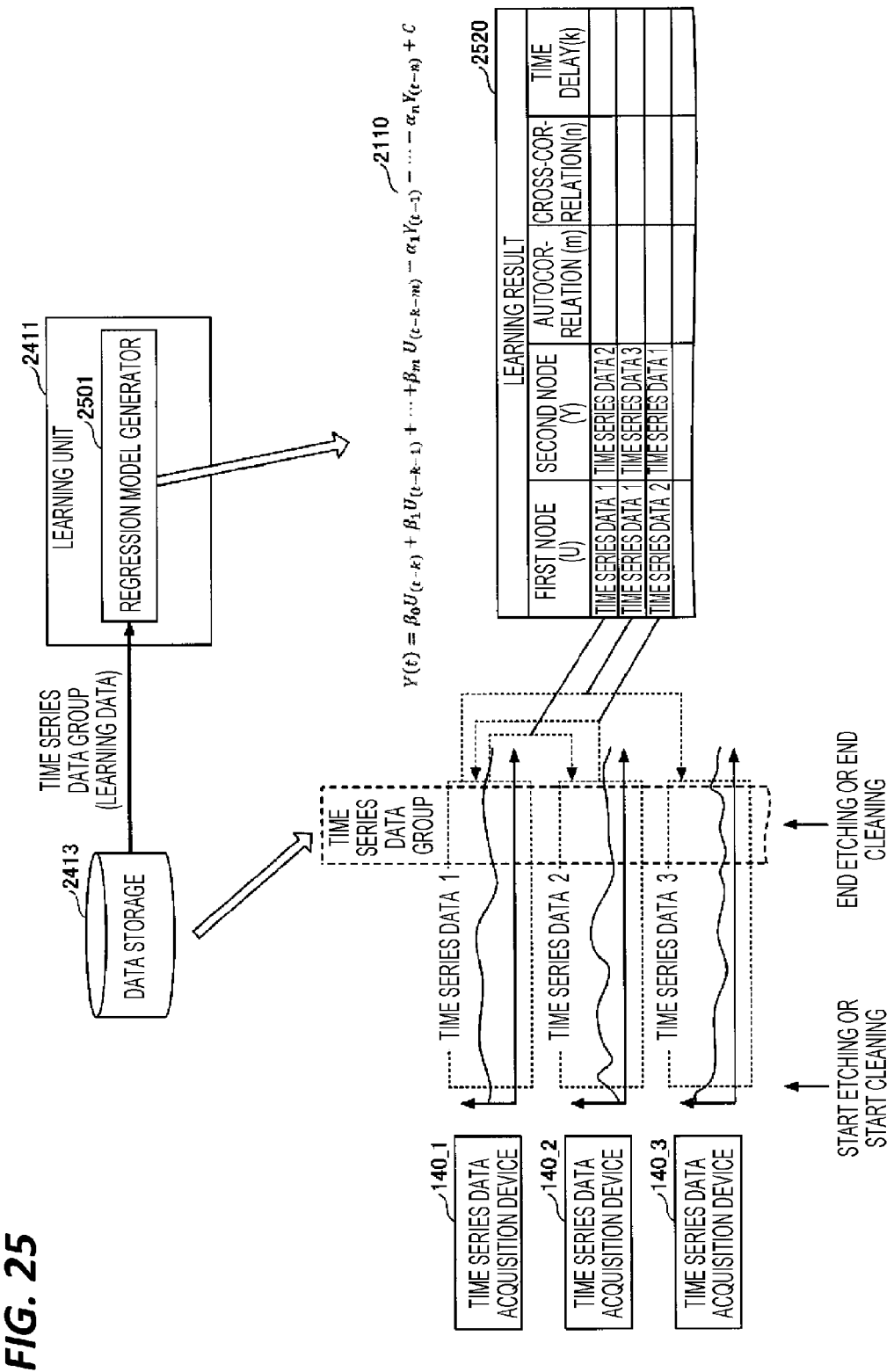
FIG. 25 is a fourth diagram illustrating a specific example of a processing by a learning unit.

Next, a specific example of a processing by the learning unit 2411 of the analysis device 2410 will be described. FIG. 25 is a fourth diagram illustrating a specific example of a processing by a learning unit. As illustrated in FIG. 25, the learning unit 2411 has a regression model generator 2501.

The regression model generator 2501 performs machine learning for the regression model using the time series data group stored in a data storage 2413. FIG. 25 illustrates a case where machine learning is performed using the time series data group measured at the time point at which the etching processing is completed or the time point at which the cleaning processing is completed. Although not illustrated in FIG. 25, machine learning may be performed using the time series data group measured at the time point at which the etching processing is started or the time point at which the cleaning processing is started.

Thus, the regression model generator 2501 defines a relationship of the time series data between the respective measurement items measured by the time series data acquisition devices 140_1 to 140_n using the formula illustrated in reference numeral 2110.

Since the method of defining a relationship of the time series data between the respective measurement items using the formula illustrated in reference numeral 2110 has already been described with reference to FIG. 21 in the fourth embodiment, the description thereof will be omitted here.

Further, In FIG. 25, the learning result 2520 illustrates each parameter of the formula illustrated in reference numeral 2110, which is calculated by performing machine learning for the regression model. Since details of the learning result 2520 have already been described with reference to FIG. 21 in the fourth embodiment, the description thereof will be omitted here.

Specific Example of Processing by End Point Detection Unit

Figure 26:
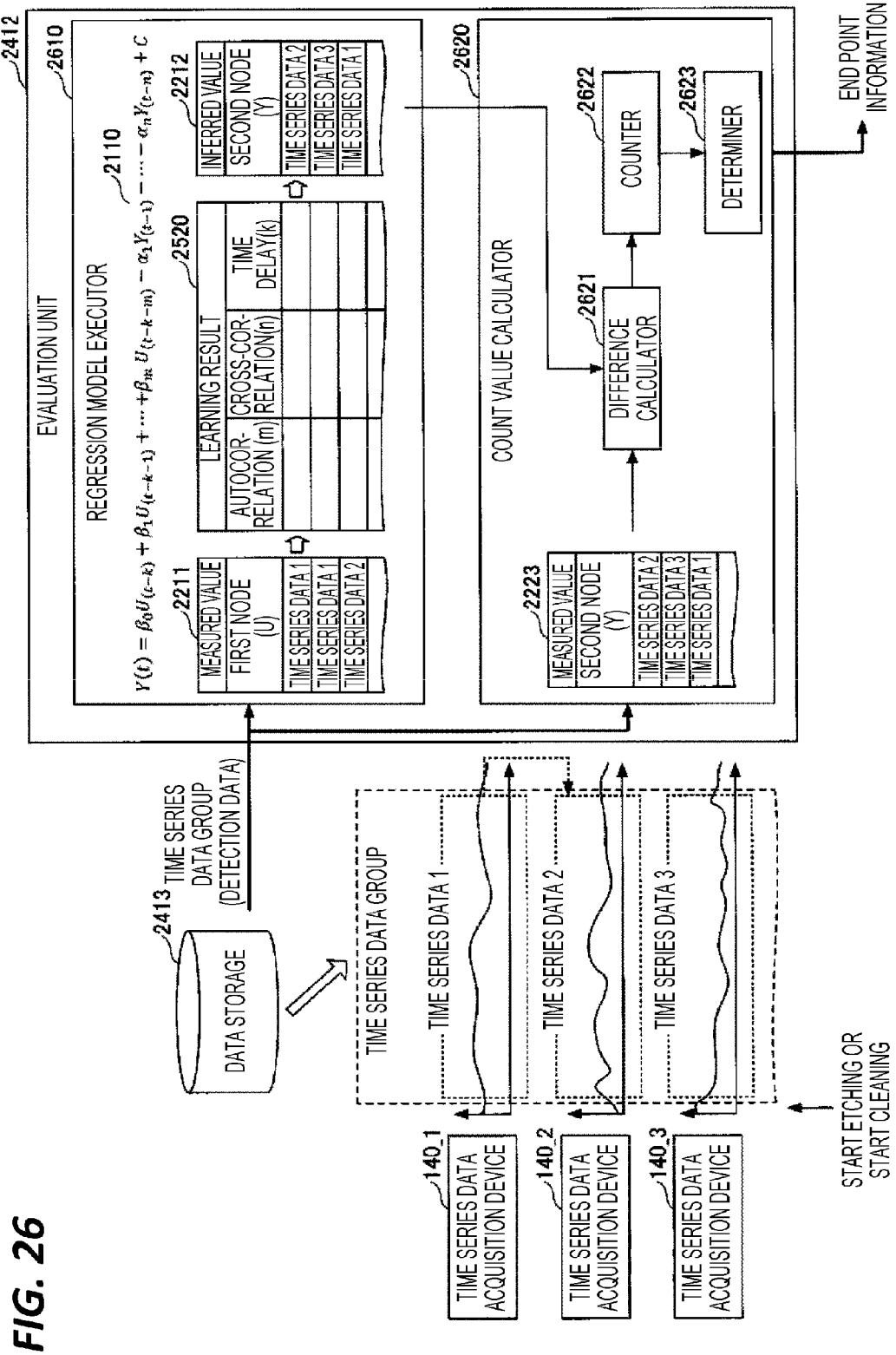
FIG. 26 is a diagram illustrating a specific example of a processing by an end point detection unit.

Next, a specific example of a processing by the end point detection unit of the analysis device 2410 will be described. FIG. 26 is a diagram illustrating a specific example of a processing by an end point detection unit. As illustrated in FIG. 26, the end point detection unit 2412 has a regression model executor 2610 and a count value calculator 2620.

The regression model executor 2610 extracts the time series data (measured value 2211) of the first node from the time series data group (detection data) measured during the etching processing or during the cleaning processing. Further, the regression model executor 2610 infers the time series data (inferred value 2212) of the second node by inputting the extracted time series data of the first node to the formula illustrated in reference numeral 2110.

At this time, the regression model executor 2610 reads out the respective parameters m, n, and k corresponding to the time series data input to the formula illustrated in reference numeral 2110 from the learning result 2520, sets them in the formula illustrated in reference numeral 2110, and then infers the time series data of the second node.

In FIG. 26, the measured value 2211 indicates the time series data of the first node input to the formula illustrated in reference numeral 2110 of the time series data group (detection data) measured during the etching processing or during the cleaning processing. Further, the inferred value 2212 indicates the time series data of the second node inferred by inputting the measured value 2211.

Meanwhile, the count value calculator 2620 includes a difference calculator 2621, a counter 2622, and a determiner 2623.

The difference calculator 2621 extracts the time series data (measured value 2223) of the second node from the time series data group (detection data) measured during the etching processing or during the cleaning processing. Further, the difference calculator 2621 acquires the inferred value 2212 from the regression model executor 2610. Further, the difference calculator 2621 calculates the difference between the measured value 2223 and the inferred value 2212.

The counter 2622 counts the number of first nodes (i.e., a predetermined count value) in which the difference calculated by the difference calculator 2621 is equal to or greater than a predetermined threshold.

When machine learning is performed using the time series data group at the time point at which the etching processing is completed or the time point at which the cleaning processing is completed, the determiner 2623 determines the time point at which the predetermined count value counted by the counter 2622 becomes equal to or less a predetermined threshold as the end point of the etching processing or the end point of the cleaning processing, and outputs the end point information.

Further, when machine learning is performed using the time series data group at the time point at which the etching processing is started or the time point at which the cleaning processing is started, the determiner 2623 determines the time point at which the predetermined count value counted by the counter 2622 becomes equal to or greater than a predetermined threshold as the end point of the etching processing or the end point of the cleaning processing, and outputs the end point information.

<Flow of End Point Detection Processing>

Figure 27:
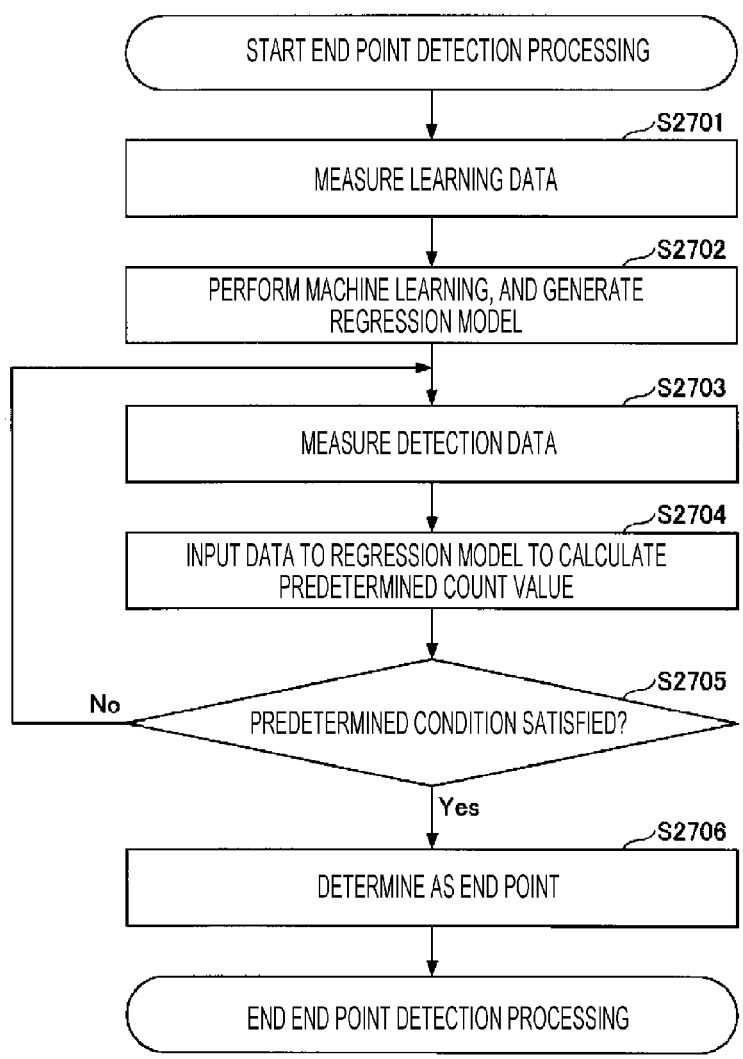
FIG. 27 is a flowchart illustrating the flow of an end point detection processing.

Next, the flow of the entire end point detection processing by the end point detection system 2400 will be described. FIG. 27 is a flowchart illustrating the flow of an end point detection processing.

In step S2701, the time series data acquisition devices 140_1 to 140_n stores the time series data group (learning data) measured at
- the time point at which the etching processing (or the cleaning processing) is completed, or
- the time point at which the etching processing (or the cleaning processing) is started.

In step S2702, the learning unit 2411 of the analysis device 2410 performs machine learning for the regression model using the time series data group (learning data) stored in the data storage 2413.

In step S2703, the time series data acquisition devices 140_1 to 140_n measure the time series data group during the etching processing or the time series data group (detection data) during the cleaning processing.

In step S2704, the end point detection unit 2412 of the analysis device 2410 inputs the time series data group (detection data) measured in step S2703 to the regression model, and calculates a predetermined count value.

In step S2705, the end point detection unit 2412 of the analysis device 2410 determines whether or not the calculated predetermined count value satisfies a predetermined condition. As used herein, the predetermined condition refers to
- a case where the value becomes equal to or less than a predetermined threshold when machine learning is performed using the time series data group measured at the time point at which the etching processing (or the cleaning processing) is completed, or
- a case where the value becomes equal to or greater than a predetermined threshold when machine learning is performed using the time series data group measured at the time point when the etching processing (or the cleaning processing) is started.

When it is determined in step S2705 that the predetermined condition is not satisfied (No in step S2705), the processing returns to step S2703.

Meanwhile, when it is determined in step S2705 that the predetermined condition is satisfied (Yes in step S2705), the processing proceeds to step S2706.

In step S2706, the end point detection unit 2412 of the analyzer 2410 determines that the end point of the etching processing or the end point of the cleaning processing is detected, and outputs the end point information.

<Summary>

As is clear from the above description, the analysis device according to the fifth embodiment is configured to:
- perform machine learning for the regression model using the time series data group measured at the time point at which the etching processing is completed or the time point at which the cleaning processing is completed: or
- perform machine learning for the regression model using the time series data group measured at the time point at which the etching processing is started or the time point at which the cleaning processing is started;
- counts the number of combinations of time series data having a predetermined relationship between respective measurement items based on the inferred value when the time series data group (detection data) measured during the etching processing or the cleaning processing is input to the regression model subjected to machine learning; and
- determines that the end point of the etching processing or the end point of the cleaning processing has been detected when the count value satisfies a predetermined condition, and outputs the end point information.

Thus, according to the analysis device of the fourth embodiment, the end point of the etching processing or the cleaning processing may be accurately determined.

Sixth Embodiment

In the six embodiment, although specific examples of the time-series data acquisition device and the time-series data group have not been mentioned, the time-series data acquisition device may be, for example,
- emission spectrophotometer,
- quadrupole mass spectrometer,
- various process sensors.

Further, the time series data group may be, for example,
- OES data,
- mass spectrometry data,
- a process data group.

Further, in the fifth embodiment, in order to detect the end point of the etching processing or the end point of the cleaning processing, machine learning is performed for the regression model using the time series data group measured at the time point at which the etching processing is completed or the time point at which the cleaning processing is completed. However, in order to detect a specific state of the etching processing or a specific state of the cleaning processing, machine learning may be performed for the regression model using the time series data group measured at a specific time point of the etching processing or a specific time point of the cleaning processing.

Other Embodiments

In each of the above embodiments, it has been described that the learning unit performs machine learning for the regression model. However, the model for which the learning unit performs machine learning is not limited to the regression model, and may be any other model as long as it is a model capable of calculating the correlation of time series data.

Further, in the second embodiment, it has been described that the first learning data and the second learning data are generated for the emission intensity data of each wavelength included in the wavelength range of visible light. However, the emission intensity data used for generating the first learning data and the second learning data may be emission intensity data of a specific wavelength. Further, the emission intensity data of a wavelength outside the wavelength range of visible light may be used.

Further, in the fourth embodiment, it has been described that the counter 2222 calculates a predetermined count value by counting the number of first nodes in which the difference calculated by the difference calculator 2221 is equal to or greater than a predetermined threshold. However, the method of counting a predetermined count value is not limited to this. For example, a predetermined count value may be calculated by counting the number of predetermined first nodes among the first nodes in which the difference calculated by the difference calculator 2221 is equal to or greater than a predetermined threshold.

Further, in the second embodiment, the OES data (or mass spectrometry data) is given as a specific example of the time series data group, and in the third embodiment, the process data group is given as a specific example of the time series data group. However, the time series data group is not limited to these. For example, it may be a time series data group representing a plasma physical quantity measured by a plasma device.

Further, in each of the above embodiments, the analysis device and the control device are configured as separate bodies, but the analysis device and the control device may be configured as one body.

According to the present disclosure, it is possible to provide an analysis device, an analysis method, and an analysis program which quantitatively evaluate the condition of a processing space in a manufacturing process based on a time series data group.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An analysis device, comprising:
   a memory storing executable instructions; and
   a processor coupled to the memory, the processor configured to execute the executable instructions to:
   perform a machine learning using a time series data group measured during a first processing of an object in a processing space, and calculate a value indicating a relationship of time series data between respective measurement items in a corresponding time range during the first processing of the object, the time series data group being in association with a condition of the processing space; and
   evaluate an unknown condition of the processing space during a second processing of the object based on the value indicating the relationship calculated by performing machine learning using the time series data group measured during the first processing of the object under a known condition of the processing space.

2. The analysis device according to claim 1, further comprising:
   a second memory configured to store, as information indicating a corresponding condition, the value indicating the relationship calculated by performing machine learning using a plurality of time series data groups measured in association with processings of the object under a plurality of known conditions of the processing space, wherein
   the processor is further configured to evaluate the unknown condition of the processing space by determining which of the values indicating the relationship stored in the second memory is similar to the value indicating the relationship calculated by performing the machine learning using the time series data group measured in association with a processing of the object under the unknown condition of the processing space.

3. The analysis device according to claim 2, wherein the second memory stores, as the information indicating the corresponding condition, the value indicating the relationship calculated by performing the machine learning using a plurality of time series data groups measured in association with processings of the object by a specific recipe under a plurality of known conditions in which the processing space is normal.

4. The analysis device according to claim 3, wherein the second memory stores, as the information indicating the corresponding condition, the value indicating the relationship calculated by performing the machine learning using a plurality of time series data groups measured in association with a processing of the object under a plurality of known conditions in which a type of deposit adhering to the processing space or an amount of the deposit differs.

5. The analysis device according to claim 3, wherein the second memory stores, as the information indicating the corresponding condition, the value indicating the relationship calculated by performing the machine learning using a plurality of time series data groups measured in association with a processing of the object under a plurality of known conditions in which a consumption degree of each part in the processing space differs.

6. The analysis device according to claim 4, wherein the plurality of time series data groups are OES data measured by an emission spectrophotometer or mass spectrometry data measured by a mass spectrometer.

7. The analysis device according to claim 5, wherein the plurality of time series data groups are process data groups measured by a process data acquisition device.

8. The analysis device according to claim 5, wherein the plurality of time series data groups are time series data groups of a plasma physical quantity measured by a plasma device.

9. The analysis device according to claim 1, wherein the value indicating the relationship is a value indicating a strength of the relationship of the time series data in the corresponding time range between the respective measurement items.

10. The analysis device according to claim 1, wherein the value indicating the relationship is a value obtained by summing the value indicating the strength of the relationship of the time series data in the corresponding time range between the respective measurement items for each measurement item.

11. The analysis device according to claim 1, wherein the processor is further configured to determine a condition adjustment parameter for changing the condition of the processing space based on the condition evaluated during the second processing of the object.

12. The analysis device according to claim 1, wherein the value indicating the relationship includes a parameter indicating autocorrelation, cross-correlation, or time delay calculated such that the time series data in a second measurement item is derived, by inputting the time series data in a first measurement item to a predetermined formula.

13. The analysis device according to claim 1, wherein the processor is further configured to determine, based on the condition evaluated during the second processing of the object, whether or not maintenance of the processing space, maintenance of a part in the processing space, or maintenance of a part affecting the processing space is necessary, or a timing of the maintenance of the processing space, a timing of the maintenance of the part in the processing space, or a timing of the maintenance of the part affecting the processing space.

14. The analysis device according to claim 1, wherein the processor determines a condition adjustment parameter for changing the condition of the processing space during the second processing in real time based on the condition evaluated in advance during the second processing.

15. An analysis method, comprising:
    performing a machine learning using a time series data group measured during a first processing of an object in a processing space, and calculating a value indicating a relationship of time series data between respective measurement items in a corresponding time range during the first processing of the object, the time series data group being in association with a condition of the processing space; and
    evaluating an unknown condition of the processing space during a second processing of the object based on the value indicating the relationship calculated by performing machine learning in the performing machine learning using the time series data group measured during the first processing of the object under a known condition of the processing space.

16. A non-transitory computer readable medium having stored therein an analysis program that causes a computer to execute a process comprising:
    performing a machine learning using a time series data group measured during a first processing of an object in a processing space, and calculating a value indicating a relationship of time series data between respective measurement items in a corresponding time range during the first processing of the object, the time series data group being in association with a condition of the processing space; and
    evaluating an unknown condition of the processing space during a second processing of the object based on the value indicating the relationship calculated by performing machine learning in the performing machine learning using the time series data group measured during the first processing of the object under a known condition of the processing space.

* * * * *